(12) United States Patent
Kim et al.

(10) Patent No.: US 11,886,254 B2
(45) Date of Patent: Jan. 30, 2024

(54) HINGE STRUCTURE AND FOLDALE ELECTRONIC DEVICE INCLUDING THE SAME

(71) Applicant: Samsung Electronics Co., Ltd., Gyeonggi-do (KR)

(72) Inventors: Hyungsoo Kim, Gyeonggi-do (KR); Jungjin Kim, Gyeonggi-do (KR); Jaeho Kang, Gyeonggi-do (KR); Giyun Lee, Gyeonggi-do (KR); Iksu Jung, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 78 days.

(21) Appl. No.: 17/517,751

(22) Filed: Nov. 3, 2021

(65) Prior Publication Data

US 2022/0206543 A1 Jun. 30, 2022

Related U.S. Application Data

(63) Continuation of application No. PCT/KR2021/015087, filed on Oct. 26, 2021.

(30) Foreign Application Priority Data

Dec. 28, 2020 (KR) ........................ 10-2020-0184340

(51) Int. Cl.
*G06F 1/16* (2006.01)

(52) U.S. Cl.
CPC .......... *G06F 1/1681* (2013.01); *G06F 1/1641* (2013.01)

(58) Field of Classification Search
None
See application file for complete search history.

(56) References Cited

U.S. PATENT DOCUMENTS

| 7,907,415 B2 | 3/2011 | Jeyama |
| 8,804,349 B2 | 8/2014 | Lee et al. |

(Continued)

FOREIGN PATENT DOCUMENTS

| CN | 202266578 U | 6/2012 |
| JP | 2020-133853 A | 8/2020 |

(Continued)

OTHER PUBLICATIONS

International Search Report dated Feb. 25, 2022.

*Primary Examiner* — Anthony Q Edwards
*Assistant Examiner* — Rashen E Morrison
(74) *Attorney, Agent, or Firm* — Cha & Reiter, LLC

(57) ABSTRACT

Disclosed is a foldable electronic device including a flexible display, a first housing and a second housing, a hinge housing, and a hinge structure. The hinge structure includes a first rotary member coupled to the first housing, a second rotary member coupled to the second housing, a first arm part coupled to the first rotary member and including a first rotary cam, a second arm part coupled to the second rotary member and including a second rotary cam, a fixed cam part including a first fixed cam engaged with the first rotary cam, a second fixed cam engaged with the second rotary cam, and a cam body connecting the first fixed cam and the second fixed cam, a stopper that restricts rotational angles of the arm parts, and an additional structure disposed between the stopper and the fixed cam part.

16 Claims, 14 Drawing Sheets

(56) References Cited

U.S. PATENT DOCUMENTS

| | | | |
|---|---|---|---|
| 9,115,750 | B2 | 8/2015 | Park |
| 9,274,552 | B2 | 3/2016 | Ahn et al. |
| 9,677,308 | B1 | 6/2017 | Chen et al. |
| 9,845,625 | B2 | 12/2017 | Park |
| 10,545,541 | B1* | 1/2020 | Dighde ................. F16M 11/38 |
| 10,761,572 | B1* | 9/2020 | Siddiqui ............... G06F 1/1681 |
| 10,761,573 | B2* | 9/2020 | Hsu ....................... G06F 1/1681 |
| 10,845,850 | B1 | 11/2020 | Kang et al. |
| 11,231,754 | B2 | 1/2022 | Kang et al. |
| 11,550,367 | B2* | 1/2023 | Lin ....................... G06F 1/1681 |
| 11,553,613 | B2* | 1/2023 | Sim ....................... G06F 1/1681 |
| 11,599,155 | B2* | 3/2023 | Siddiqui ............... G06F 1/1618 |
| 2010/0149764 | A1 | 6/2010 | Ueyama |
| 2012/0147535 | A1 | 6/2012 | Ahn et al. |
| 2013/0322004 | A1 | 12/2013 | Park |
| 2014/0111954 | A1 | 4/2014 | Lee et al. |
| 2015/0345195 | A1 | 12/2015 | Park |
| 2018/0066465 | A1* | 3/2018 | Tazbaz ................ E05D 11/1007 |
| 2018/0356858 | A1* | 12/2018 | Siddiqui ............... G06F 1/1681 |
| 2020/0267244 | A1 | 8/2020 | Kim et al. |
| 2021/0307186 | A1* | 9/2021 | Hong ................. H04M 1/0216 |
| 2021/0392213 | A1 | 12/2021 | Kim et al. |
| 2022/0019270 | A1* | 1/2022 | Su ......................... G06F 1/1681 |
| 2022/0113770 | A1 | 4/2022 | Kang et al. |

FOREIGN PATENT DOCUMENTS

| | | |
|---|---|---|
| KR | 10-2008-0033309 A | 4/2008 |
| KR | 10-2010-0079459 A | 7/2010 |
| KR | 10-2012-0064585 A | 6/2012 |
| KR | 10-2014-0050504 A | 4/2014 |
| KR | 10-2020-0099054 A | 8/2020 |
| KR | 10-2020-0101251 A | 8/2020 |
| KR | 10-2020-0126524 A | 11/2020 |
| KR | 10-2020-0135636 A | 12/2020 |

\* cited by examiner

<401>

<403>

<405>

<705>

<703>

HINGE STRUCTURE AND FOLDALE ELECTRONIC DEVICE INCLUDING THE SAME

CROSS-REFERENCE TO RELATED APPLICATION(S)

This application is continuation of International Application No. PCT/KR2021/015087, filed on Oct. 26, 2021, which claims priority to Korean Patent Application No. 10-2020-0184340 filed on Dec. 28, 2020 in the Korean Intellectual Property Office, the disclosures of which are herein incorporated by reference.

TECHNICAL FIELD

One or more embodiments of the instant disclosure generally relates to a foldable electronic device having a hinge structure.

BACKGROUND ART

A portable electronic device, such as a smartphone, may provide various functions, such as voice communication, playback of videos, and online internet searches, using various kinds of applications. For many of the provided functions, such as video playback, a larger screen is preferred. However, having larger screens negatively impact the portability of the devices. Accordingly, a foldable portable electronic device that may increase portability by utilizing a folded structure and a foldable screen has been developed.

In a foldable electronic device, because a hinge structure is connected to adjacent housings and a display positioned on the housings can be folded or unfolded (or opened), a wider or larger screen may be provided if necessary. In this process, a free-stop function may be provided such that the foldable electronic device is held at a specific angle that is smaller than 180 degrees. In this regard, the foldable electronic device according to the embodiment employs a cam structure, and uses an elastic member in relation to the cam structure for generation of an elastic force (or a frictional force) for cam operation.

While the state of the above-described foldable electronic device is changed from a closed state to an unfolded state, the elastic force by the elastic member may be applied such that the closed state is maintained. Accordingly, when the device is closed, excessive force may be needed to open the device when the user attempts to open the device with one hand.

SUMMARY

Certain embodiments provide a hinge structure that may release a closed state of a foldable electronic device more easily, and a foldable electronic device including the same.

According to the above-described various embodiments, an electronic device (or a portable electronic device, a portable communication device, a foldable electronic device, or a foldable electronic device having a communication function) of an embodiment may include a flexible display, a first housing and a second housing, a hinge housing, and a hinge structure, at least a portion of which is seated in the hinge housing, the hinge structure may further include a first rotary member coupled to the first housing, a second rotary member coupled to the second housing, a first arm part coupled to the first rotary member and including a first rotary cam, a second arm part coupled to the second rotary member and including a second rotary cam, a fixed cam part including a first fixed cam engaged with the first rotary cam, a second fixed cam engaged with the second rotary cam, and a cam body connecting the first fixed cam and the second fixed cam, a stopper that restrict rotational angles of the first arm part and the second arm part, and an additional structure having a specific thickness and disposed between the stopper and the fixed cam part.

A hinge structure according to an embodiment of the disclosure may further include a first rotary member coupled to a first housing, a second rotary member coupled to a second housing, a first arm part coupled to the first rotary member and including a first rotary cam, a second arm part coupled to the second rotary member and including a second rotary cam, a first fixed cam engaged with the first rotary cam and a second fixed cam engaged with the second rotary cam, a fixed cam part including a cam body connecting the first fixed cam and the second fixed cam, a stopper that restricts rotational angles of the first arm part and the second arm part, and an additional structure disposed between the stopper and the fixed cam part.

The hinge structure and the foldable electronic device including the same according to certain embodiments may easily release the closed state of the foldable electronic device when the user attempts to open the device with one hand.

Furthermore, damage to the display may be prevented by reducing the pressure applied to release the closed state of the foldable electronic device and reducing the pressure applied by the user to the display when the user attempts to open the device (or a closed state of the device is released by the user).

Other various purposes and effects provided by the foldable electronic device according to certain embodiments may be mentioned in the descriptions of the embodiments of the detailed description or be discerned therefrom.

DETAILED DESCRIPTION

Figure 1A:
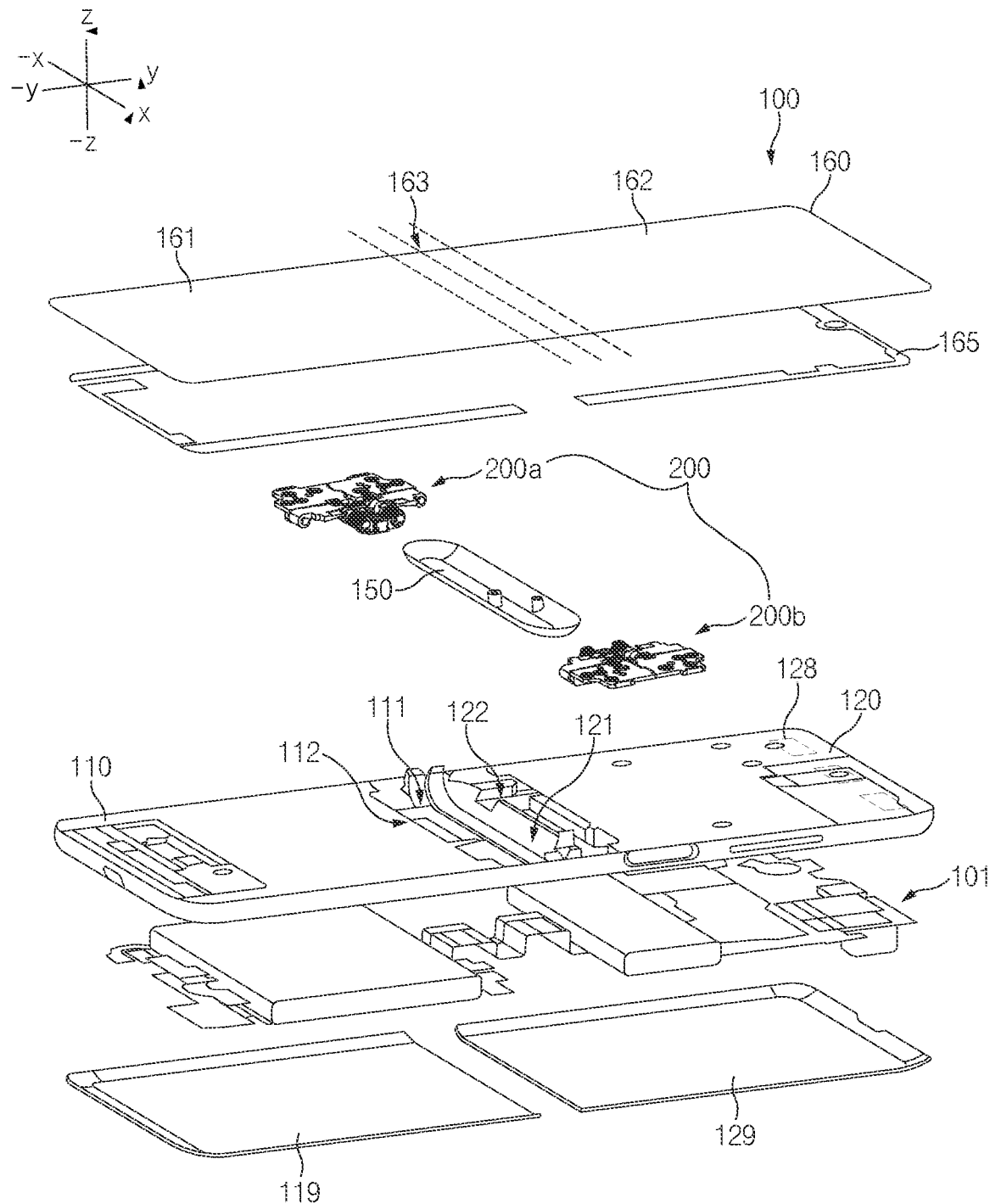
FIG. 1A is a view illustrating an exploded perspective view of a foldable electronic device according to an embodiment.

Hereinafter, various embodiments of the disclosure will be described with reference to the accompanying drawings. Accordingly, those of ordinary skill in the art will recognize that modification, equivalent, and/or alternative on the various embodiments described herein can be variously made without departing from the scope and spirit of the disclosure. With regard to the description of drawings, similar components may be denoted by similar reference numerals.

In the disclosure disclosed herein, the expressions "have", "may have", "include" and "comprise", or "may include" and "may comprise" used herein indicate existence of corresponding features (e.g., elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments of the disclosure, but do not limit the elements. For example, such terms are used only to distinguish an element from another element and do not limit the order and/or priority of the elements. For example, a first user device and a second user device may represent different user devices irrespective of sequence or importance. For example, without departing from the scope of the disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it can be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used herein may be used as, for example, the expression "suitable for", "having the capacity to", "designed to", "adapted to", "made to", or "capable of". The term "configured to (or set to)" must not mean only "specifically designed to" in hardware. Instead, the expression "a device configured to" may mean that the device is "capable of" operating together with another device or other components. CPU, for example, a "processor configured to perform A, B, and C" may mean a dedicated processor (e.g., an embedded processor) for performing a corresponding operation or a generic-purpose processor (e.g., a central processing unit (CPU) or an application processor) which may perform corresponding operations by executing one or more software programs which are stored in a memory device.

Terms used in this specification are used to describe specified embodiments of the disclosure and are not intended to limit the scope of the disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the disclosure. According to occasions, even a term defined in the disclosure cannot be construed to exclude the embodiments of the disclosure.

A foldable electronic device or an electronic device according to various embodiments of the disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), MP3 players, mobile medical devices, cameras, and wearable devices. According to various embodiments of the disclosure, the wearable devices may include accessories (e.g., watches, rings, bracelets, ankle bracelets, glasses, contact lenses, or head-mounted devices (HMDs)), cloth-integrated types (e.g., electronic clothes), body-attached types (e.g., skin pads or tattoos), or implantable types (e.g., implantable circuits).

Hereinafter, electronic devices according to an embodiment of the disclosure will be described with reference to the accompanying drawings. The term "user" used herein may refer to a person who uses an electronic device or may refer to a device (e.g., an artificial electronic device) that uses an electronic device.

Figure 1B:
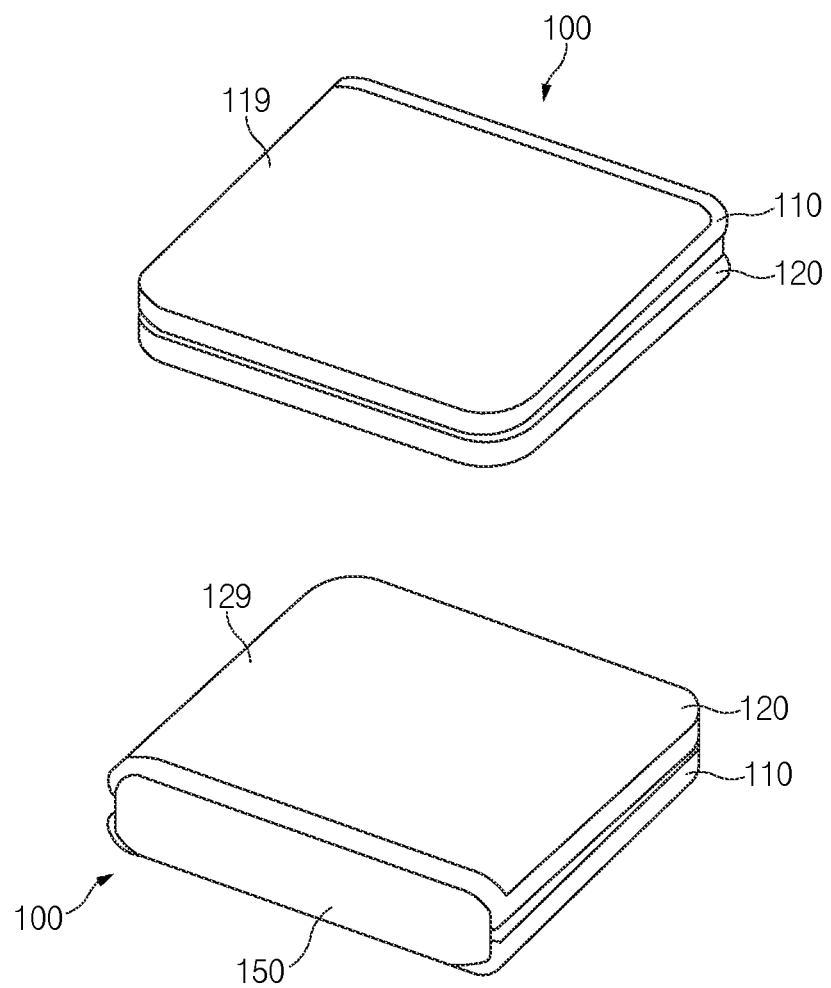
FIG. 1B is a view illustrating an example of an external appearance of a foldable electronic device in a folded state according to an embodiment.

FIG. 1A is a view illustrating an exploded perspective view of a foldable electronic device according to an embodiment. FIG. 1B is a view illustrating an example of an external appearance of a foldable electronic device in a folded state according to an embodiment.

Referring to FIGS. 1A and 1B, a foldable electronic device 100 (or an electronic device, a portable electronic device, or a portable foldable electronic device) according to an embodiment may include a first housing 110 and a second housing 120, a display 160 (e.g., a flexible display), a hinge structure 200 (or a hinge structure, or a hinge member), a hinge housing 150, in which the hinge structure 200 is disposed on an inside thereof, various electronic elements 101 (e.g., a battery, a printed circuit board, a camera, at least one sensor, a communication circuit, and an antenna) related to the functioning of the foldable electronic device 100, a first cover 119 covering at least a portion of one surface (e.g., a surface that faces the +z axis direction) of the first housing 110, and a second cover 129 covering one surface (e.g., a surface that faces the −z axis direction) of the second housing 120. FIG. 1A illustrates an exploded perspective view in a first state (e.g., a flat state, an unfolding state, an unfolded state, or an opened state) of the foldable electronic device 100. FIG. 1B is a perspective view in a second state (e.g., a folded state, a folding state, or a closed state) of the foldable electronic device 100.

According to an embodiment, the first housing 110 may be disposed to be continuous to the second housing 120 in the y axis direction or may be disposed in parallel to the second housing 120 in the z axis direction in the various states of the electronic device. Furthermore, when at least a portion of a central part 163 of the display 160 is folded, one surface (e.g., a surface that faces the z axis direction in FIG. 1A) of the first housing 110 may be disposed to face one surface (a surface that faces the z axis direction in FIG. 1A) of the second housing 120.

The first housing 110, for example, may be configured such that at least a portion thereof is made of a metallic material or at least a portion thereof is made of a nonmetallic material. For example, the first housing 110 may be made of a material having a specific strength to support at least a portion of the display 160. An area (e.g., a first part 161 and a portion of the central part 163 of the display 160) of the display 160 may be disposed at at least a portion of a front surface (e.g., a surface that faces the z axis direction in FIG. 1A) of the first housing 110. At least a portion of the first housing 110 may be bonded to an area (e.g., at least a portion of the first part 161 and the portion of the central part 163) of the display 160 using a bonding means, a bonding member, or bonding tape. For example, at least a portion of an edge of a front surface of the first housing 110 may be bonded to at least a portion of an edge of an area (e.g., the first part 161 and the portion of the central part 163) of the display 160. Furthermore, one side of an upper portion of the front surface of the first housing 110 may be bonded to one side of the first part 161 of the display 160. In this regard, at least a portion of a bonding layer 165 (or bonding means, bonding member, or bonding tape) may be disposed at at least a portion between the first housing 110 and the first part 161 of the display 160. At least a portion of the inside of the first housing 110 may be provided such that the interior thereof is empty or may be provided such that the interior thereof is empty after the first housing 110 is coupled to the first cover 119 so that the electronic element 101 (e.g., an element, such as a printed circuit board, at least one processor mounted on the printed circuit board, at least one memory, or a battery) that is necessary for driving the display 160 may be disposed.

According to an embodiment, edge ends (edge ends of the three sides other than the edge that faces the second housing 120) of the first housing 110 may protrude by a specific height further than a bottom surface of a central part of the housing to surround an edge of at least one side of the display 160. Furthermore, side walls, at least portions of which face an edge of the display 160, may be disposed at at least a portion of the edge ends of the first housing 110. Side walls formed at at least a portion of an edge of the first housing 110 may have specific heights at the three edges other than the edge that faces the second housing 120. The edge portion of the first housing 110 that faces the second housing 120 may include a recessed part 111, at least a portion of which has a specific curvature such that at least a portion of the hinge housing 150 is disposed. According to an embodiment, the first housing 110 may include a first stepped part 112, in which a portion of the hinge structure 200 mounted on the hinge housing 150 is seated, at an edge part that faces the second housing 120.

According to an embodiment, the second housing 120 may be disposed in parallel to the first housing 110 or may be disposed such that at least one surface thereof faces one surface (e.g., a surface on which the display 160 is disposed) of the first housing 110 in the various states of the electronic device. The second housing 120 may be made of the same material as the first housing 110. Because the second housing 120 is disposed to be symmetrical to the first housing 110 in several directions, such as leftwards, rightwards, upwards, and downwards, at least a portion (e.g., a second part 162 of the display 160 and an opposite side of the central part 163) of the remaining area of the display 160, other than the area disposed in the first housing 110, may be disposed to be supported by a front surface of the second housing 120. At least a portion of the second housing 120 may be bonded to at least a portion of the second part 162 and the opposite side of the central part 163 of the display 160. For example, an edge of the front surface of the second housing 120 may be bonded to at least a portion of the second part 162 and the opposite side of the central part 163 of the display 160. Furthermore, one side of a lower portion of a front surface (e.g., a surface that faces the z axis direction in FIG. 1A) of the second housing 120 may be bonded to one side of the second part 162 of the display 160. In this regard, at least a portion of the bonding layer 165 (or bonding means, bonding member, adhesive member, or bonding tape) may be disposed at at least a portion between the second housing 120 and the second part 162 of the display 160. At least a portion of the inside of the second housing 120 may be configured such that the interior thereof is empty similarly to the first housing 110 or may be configured such that the interior thereof is empty after the second housing 120 is coupled to the second cover 129 so that electronic elements that are necessary for driving the display 160 may be disposed. At least one magnet member (or magnet structure) 128 may be disposed on one side of the second housing, for example, in the far +y direction (or at a y axis edge). The magnet member 128 may pull at least a portion of the first housing 110 through an attractive force such that ends (e.g., edges in the z axis direction) of the first housing 110 and the second housing 120 are prevented from being widened in the closed state of the foldable electronic device 100. In this regard, in the closed state of the foldable electronic device 100, a partial area of the first housing 110, which corresponds to an area of the second housing 120, in which the magnet member 128 is disposed, may be made of a metal member (or metal structure, or metal layer, or metal sheet) that may generate an attractive force with the magnet member 128. Furthermore, another magnet member having a polarity that may generate an attractive force with the magnet member 128 may be disposed in a corresponding location in the first housing 110.

According to an embodiment, edge ends (edge ends of the three edges other than the edge that faces the first housing 110) of the second housing 120 may protrude by a specific height further than a bottom surface of a central part of the second housing 120 to surround the corresponding edges of the display 160. Furthermore, similarly to the side walls formed in the first housing 110, side walls, at least portions of which face the edge of the display 160, may be disposed at at least a portion of the edge end of the second housing 120. Side walls formed at at least a portion of an edge of the second housing 120 may have specific heights at the three edges other than the edge that faces the first housing 110.

A portion of the second housing 120, which faces the first housing 110, may include a recessed part 121, at least a portion of which has a specific curvature such that the hinge housing 150 is disposed. According to an embodiment, the second housing 120 may include a second stepped part 122, in which a portion of the hinge structure 200 mounted on the hinge housing 150 is seated, at an edge part that faces the first housing 110.

According to an embodiment, the foldable electronic device 100 may include at least one sensor disposed on one side of the first housing 110 or the second housing 120 for management of a specific function of the foldable electronic device 100. The sensor, for example, may include at least one of a proximity sensor, an illumination sensor, an iris sensor, an image sensor (or a camera), or a fingerprint sensor.

According to an embodiment, the hinge housing 150 may be covered by one side of the first housing 110 or the second housing 120 (e.g., in an unfolded state of the first housing 110 and the second housing 120) or be exposed to the outside (e.g., in a folded state of the first housing 110 and the second housing 120) according to the folded or unfolded state of the foldable electronic device 100. For example, as shown in FIG. 1A, when the first housing 110 and the second housing 120 are disposed parallel to each other, the hinge housing 150 may be covered by the first housing 110 and the second housing 120. As shown in FIG. 1B, when one surface of the first housing 110 and one surface of the second housing 120 are disposed to face each other in the closed state of the electronic device, the hinge housing 150 may be disposed such that at least a portion thereof is exposed to the outside at edges (e.g., edges of the first housing 110 and the second housing 120, which face each other in the unfolded state) of one side of the first housing 110 and the second housing 120.

According to an embodiment, at least a portion of the display 160 may be flexible. According to an embodiment, the display 160 may include the first part 161 disposed on the first housing 110, the second part 162 disposed on the second housing 120, and the central part 163 or a central area that are adjacent to the first housing 110 and the second housing 120. According to another embodiments, the entire display 160 may be flexible. The central part 163 of the display 160 may be disposed not to be bonded to the first housing 110 and the second housing 120. For example, the central part 163 of the display 160 may be spaced apart from front surfaces (e.g., surfaces that face the z axis direction in FIG. 1A) of the first housing 110 and the second housing 120 by a specific interval. In other words, a specific gap may be formed between the central part 163 of the display 160 and the first housing 110 and the second housing 120. The first part 161 of the display 160 may be bonded to at least a portion of the first housing 110, and the second part 162 of the display 160 may be bonded to at least a portion of the second housing 120. In this regard, a portion of the bonding layer 165 may be disposed in at least a partial area between the display 160 and the first housing 110, and another portion of the bonding layer 165 may be disposed in at least a partial area between the display 160 and the second housing 120. According to an embodiment, the bonding layer 165, as illustrated, may be disposed only at the edges of the first housing 110 and the second housing 120.

According to an embodiment, the hinge structure 200 may include a first hinge structure 200a, at least a portion of which is disposed on one side (e.g., in the far −x direction or −x axis edge) of the hinge housing 150, and a second hinge structure 200b, at least a portion of which is disposed on an opposite side (e.g., in the far +x direction or +x axis edge) of the hinge housing 150. The first hinge structure 200a and the second hinge structure 200b may have the same structure and the same configuration, and may be disposed to be symmetrical to each other leftwards and rightward with respect to the y axis. Although it is exemplified in the illustrated drawings that two hinge structures (e.g., the first hinge structure 200a and the second hinge structure 200b) are disposed, the disclosure is not limited thereto. For example, at least portions of the two or more hinge structures may be received or disposed in the hinge housing 150. According to an embodiment, the first hinge structure 200a and the second hinge structure 200b may support a cam operation. The first hinge structure 200a and the second hinge structure 200b may include an additional structure (or an auxiliary structure or a structure) that may reduce the magnitude of pressure applied to a cam structure (e.g., rotary cam and fixed cam) during the cam operation. For example, the first hinge structure 200a and the second hinge structure 200b may include an additional structure disposed such that pressure applied by a pressing structure (e.g., an elastic member) is 0 (there is no pressure or the pressure is balanced) or less than a specific reference value (e.g., a value that converges to 0). According to an embodiment, a state of the foldable electronic device 100 that reduces the magnitude of the pressing force provided by the pressing structure to the additional structure may include a state in which the electronic device is opened to a specific angle range (e.g., the angle between the first housing 110 and the second housing 120 is 60 degrees) from the closed state. Further, the state of the foldable electronic device 100 that reduces the magnitude of the pressing force provided by the pressing structure to the additional structure may include a state in which the electronic device is opened to a specific angle range (e.g., the angle between the first housing 110 and the second housing 120 is 150 degrees) from a fully unfolded state (e.g., the angle between the first housing 110 and the second housing 120 is 180 degrees or more). In the following description, technology of operating an additional structure to be in an unfolded state of a specific angle from the closed state will be described as a representative example. The operation technology of the additional structure, which will be described below, may be applied similarly to other state operations, such as changing the device to an unfolded state of a specific angle from the fully unfolded state, or changing the device from the fully unfolded state to the folded state. The disclosed embodiments may apply a relatively low force even when the fully unfolded foldable electronic device 100 is changed to be fully folded.

Figure 2:
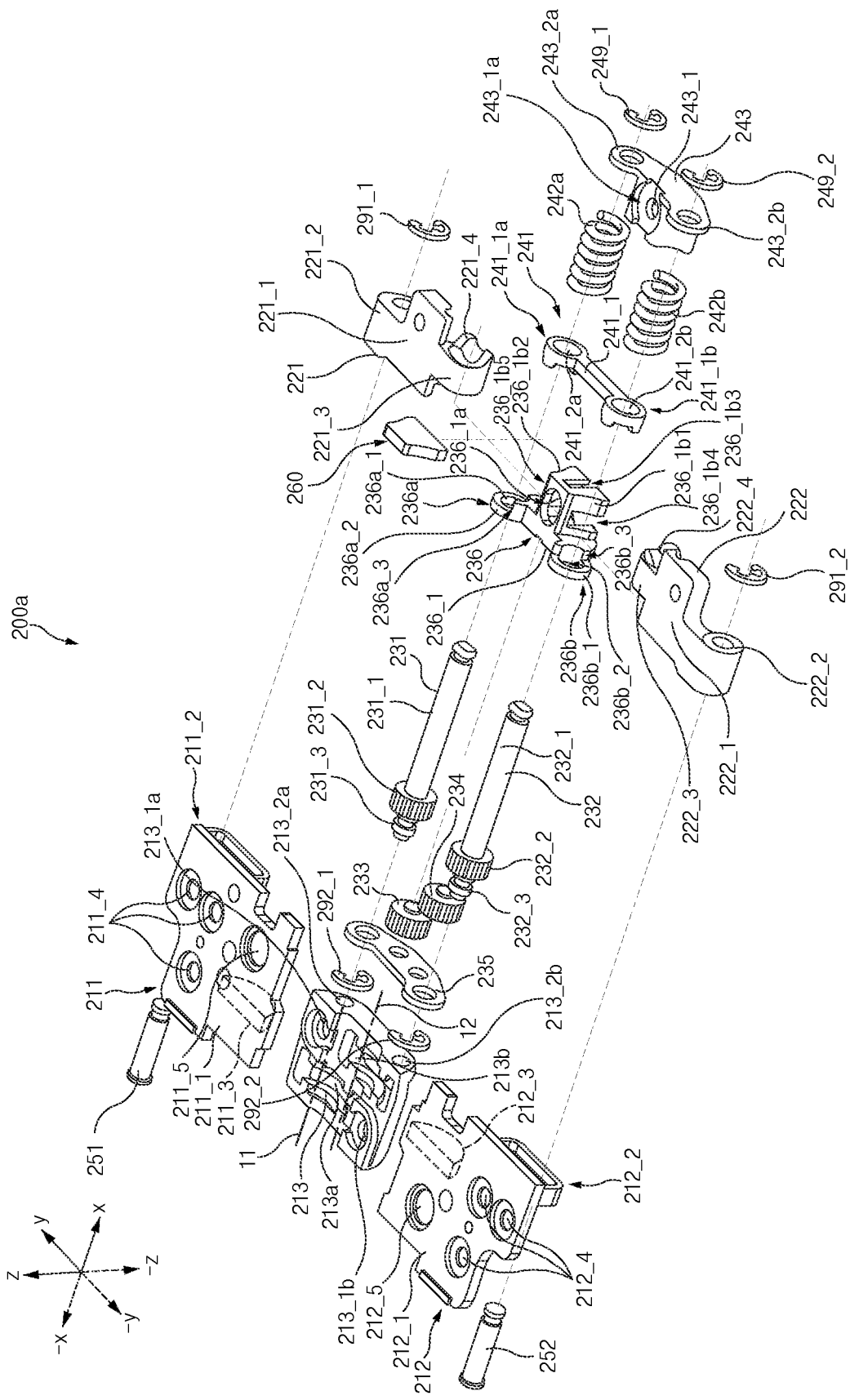
FIG. 2 is a view illustrating an exploded perspective view of a hinge structure of a foldable electronic device according to an embodiment.

FIG. 2 is a view illustrating an exploded perspective view of a hinge structure of a foldable electronic device according to an embodiment.

In the following description, between the hinge structures 200a and 200b, the first hinge structure 200a will be described as an example. The structure and configuration of the first hinge structure 200a described in FIG. 2 may be the same as those of the second hinge structure 200b described above in relation to FIGS. 1A to 1B.

Referring to FIGS. 1A to 2, the first hinge structure 200a may include a fixing bracket 213, a first rotary member (or first rotary structure) 211, a second rotary member (or second rotary structure) 212, a first fixing part (or portion, unit, structure) 251 and a second fixing part (or portion, unit, structure) 252, a first arm part 221 (or arm part, arm unit, arm portion, arm structure), a second arm part 222, a first rotary shaft 231 (or first shaft), a second rotary shaft 232 (or second shaft), a stopper 236 (or stop-unit, stop-structure, stop-member), a fixed cam part 241 (or fixed cam portion, fixed cam member, fixed cam structure), a first elastic body 242a, a second elastic body 242b, a support bracket 243, a first idle gear 233 (or first gear), a second idle gear 234 (or second gear), a support plate 235, and a plurality of fixing clips 291_1, 291_2, 292_1, 292_2, 249_1, and 249_2. At least some of the above-described configurations of the first hinge structure 200a may be made of a metallic material to have a specific strength. Furthermore, depending on what is required, at least a portion of the first hinge structure 200a may be made of a material such as reinforced plastic or resin.

At least a portion of the shape of a lower surface (e.g., a surface in the −z axis direction) of the fixing bracket 213 may have a curved surface. For example, a z axis cross-section of at least a portion of the lower surface of the fixing bracket 213 may include a curve to correspond to an inner shape of the hinge housing 150 for fixing and bracketing. At least a portion of the upper surface (e.g., a surface in the z axis direction) of the fixing bracket 213 may have a flat shape, and rail grooves 213a and 213b may be formed such that the rotary members 211 and 212 are coupled thereto. According to an embodiment, the fixing bracket 213 may include a first rail groove 213a, of which at least a portion of its cross-section is arc-shaped from an upper surface (e.g., the surface in the z axis direction) thereof toward a lower surface (e.g., the surface in the −z axis direction), and into which a first rail 211_3 of the first rotary member 211 is inserted from the first direction (e.g., the y axis direction) to the second direction (e.g., the −y axis direction). According to an embodiment, the fixing bracket 213 may include a second rail groove 213b, of which at least a portion of its cross-section is arc-shaped from an upper surface (e.g., the surface in the z axis direction) thereof toward a lower surface (e.g., the surface in the −z axis direction), and into which a second rail 212-3 of the second rotary member 212 is inserted from the second direction (e.g., the −y axis direction) to the first direction (e.g., the y axis direction). The first rail groove 213a may be biased in the y axis direction as compared with the second rail groove 213b, and the second rail groove 213b may be biased in the −y axis direction as compared with the first rail groove 213a. The first rail groove 213a may be rotated about a first imaginary axis 11, and the second rail groove 213b may be rotated about a second imaginary axis 12. The first imaginary axis 11 and the second imaginary axis 12 may be formed on an upper surface (e.g., the surface in the z axis direction) of the fixing bracket 213, and the first imaginary axis 11 and the second imaginary axis 12 may be spaced apart from each other by a specific interval. According to an embodiment, the fixing bracket 213 may include a first holding recess 213_2a, in which one end (e.g., at least a portion of a first seating part 231_3) of the first rotary shaft 231, and a second holding recess 213_2b, in which one end (e.g., at least a portion of a second seating part 232_3) of the second rotary shaft 232 is seated.

According to an embodiment, the fixing bracket 213 may include a first fixing hole 213_1a and a second fixing hole 213_1b that are used to fix the fixing bracket 213 to the hinge housing 150. In the foldable electronic device 100, the fixing bracket 213 may be fixed to the hinge housing 150 by using a coupling member (e.g., a screw or the like). According to an embodiment, the first fixing hole 213_1a and the second fixing hole 213_1b may be disposed to be symmetrical to each other in a diagonal direction on the upper surface (e.g., the surface in the z axis direction) of the fixing bracket 213 to fix the fixing bracket 213 to the hinge housing 150 more firmly and stably.

The first rotary member 211 may include a first bracket body 211_1, a first slide hole 211_2 formed at an end (e.g., an end in the x axis direction) on one side of the first bracket body 211_1, a first rail 211_3 formed at an end (e.g., an end in the −y axis direction) on an opposite side of the first bracket body 211_1, and a first housing coupling hole 211_4 used for coupling to the first housing 110. Additionally, the first rotary member 211 may further include a first bracket opening hole 211_5 arranged to correspond to the first fixing hole 213_1a formed in the fixing bracket 213.

At least a portion of the upper surface (e.g., the surface disposed in the z axis direction) of the first bracket body 211_1 may be formed flat. With reference to the illustrated drawings, the first slide hole 211_2 may be disposed in a downward direction (e.g., the −z axis direction) at a right end (e.g., an end in the x axis direction) of the first bracket body 211_1, and the first rail 211_3 may be disposed on a lower surface (e.g., the surface in the −z axis direction) thereof at an end (e.g., an end in the −y axis direction) on one side of the first bracket body 211_1.

The first slide hole 211_2 may be disposed at an end (e.g., the end in the x axis direction) on a side of the first bracket body 211_1, and may be disposed on a lower side of the first bracket body 211_1. A length of the first slide hole 211_2 in the first direction (e.g., the y axis direction) may be longer than a length thereof in a third direction (e.g., the x axis direction). Accordingly, the first fixing part 251 inserted into the first slide hole 211_2 may be slid in any one of the first direction (e.g., the y axis direction) and the second direction (e.g., the −y axis direction) in the first slide hole 211_2. The first slide hole 211_2 may be disposed to face a surface in a fourth direction of the first arm part 221 (e.g., the surface disposed in the −x axis direction). At least a partial area of the first slide hole 211_2 may be arranged with a first connector 221_2 of the first arm part 221. Accordingly, at least a portion of the first fixing part 251 may be disposed inside the first slide hole 211_2 and the first connector 221_2.

The first rail 211_3 may be disposed at an end in the second direction (e.g., the end in the −y axis direction) of the first bracket body 211_1, and may be disposed on a lower side of the first bracket body 211_1. The first rail 211_3 may have an arc shape having a specific angle with respect to the x axis. The first rail 211_3 may be inserted into the first rail groove 213a disposed in the fixing bracket 213, and may be rotated along the first rail groove 213a in a specific angle range with respect to the first imaginary axis 11. According to an embodiment, a rotation range of the first rail 211_3, for example, may be a range of −10 degrees to 100 degrees (or a range of 0 degrees to 90 degrees). The first rail 211_3 may be rotated (e.g., rotated in a clockwise direction or in a counterclockwise direction with respect to the x axis) between the y axis and the z axis with respect to the first imaginary axis 11 formed by the first rail groove 213a.

The first housing coupling hole 211_4 may be formed on one side (e.g., an edge on one side that faces the y axis direction) of the first bracket body 211_1, and may be formed to pass through a surface in the z axis direction and a surface in the −z axis direction. Although it is exemplified in the illustrated drawings that three first housing coupling holes 211_4 are formed in the first bracket body 211_1, various embodiments of the disclosure are not limited to the number. A coupling member may be coupled to a coupling member (e.g., a boss) provided in the first housing 110 while at least a portion thereof is coupled to the first housing coupling hole 211_4, and thus the first rotary member 211 may be fixed to the first housing 110.

The second rotary member 212 may include a second bracket body 212_1, a second slide hole 212_2 formed at an end (e.g., an end in the x axis direction) on one side of the second bracket body 212_1, a second rail 212_3 formed at an end (e.g., an end in the y axis direction) on an opposite side of the second bracket body 212_1, and a second housing coupling hole 212_4 used for coupling to the second housing 120. Additionally, the second rotary member 212 may further include a second bracket opening hole 211_5 arranged to correspond to the second fixing hole 213_1b formed in the fixing bracket 213.

The second bracket body 212_1 may have substantially the same shape as that of the first bracket body 211_1. Accordingly, at least a portion of the upper surface (e.g., a surface disposed in the z axis direction) of the second bracket body 212_1 may be formed flat.

The second slide hole 212_2 may be disposed at a right end (e.g., the end in the x axis direction) of the second bracket body 212_1, and may be disposed on a lower side of the second bracket body 212_1. The second slide hole 212_2 may be disposed to be symmetrical to the first slide hole 211_2 with respect to the fixing bracket 213. The second slide hole 212_2 may have the same shape as that of the first slide hole 211_2.

The second rail 212_3 may be disposed at an end in the first direction (e.g., the end in the y axis direction) of the second bracket body 212_1, and may be disposed on a lower side of the second bracket body 212_1. The second rail 212_3 may have substantially the same shape as that of the first rail 211_3, and may be inserted into the second rail groove 213b. For example, the second rail 212_3 may have an arc shape in a specific angle range with respect to the x axis. The second rail 212_3 may be rotated in a specific angle range with respect to the second imaginary axis 12, for example, 80 degrees to 190 degrees (or 90 degrees to 180 degrees). For example, the second rail 212_3 may be rotated (e.g., rotated in a counterclockwise direction or a clockwise direction about the x axis) in a range between the −y axis and the z axis.

The second housing coupling hole 212_4 may be formed on one side (e.g., an edge on one side that faces the −y axis direction) of the second bracket body 212_1, and may be formed to pass through a surface in the z axis direction and a surface in the −z axis direction.

The first fixing part 251 may have a pin shape having a specific length in one direction (e.g., the x axis direction). A length of the first fixing part 251 may be larger than a total sum of the hole length (e.g., an x axis depth) of the first slide hole 211_2 and the hole length (or an x axis depth) of the first connector 221_2 of the first arm part 221. After the first fixing part 251 is inserted into the first slide hole 211_2 and the first connector 221_2, at least one of the opposite sides of the first fixing part 251 may be fixed (for example, by using a separate E ring). A diameter of the first fixing part 251 may be smaller than a diameter of the first connector 221_2. The first fixing part 251 may be located in the first slide hole 211_2, and may be slid in the y axis or −y axis direction.

The second fixing part 252 may have substantially the same shape as that of the first fixing part 251. The second fixing part 252 may be disposed at a location that is symmetrical to the first fixing part 251 with respect to the fixing bracket 213, and at least a portion thereof may be inserted into and fixed to the second slide hole 212_2 and a second connector 222_2. One side of the second fixing part 252 may be slid in the second slide hole 212_2 in the y axis or −y axis direction.

The first arm part 221 may be coupled to the first rotary member 211 through the first fixing part 251, and may be rotated in a specific angle range in association with the first rotary member 211 during a hinge operation. According to an embodiment, the first arm part 221 may include a first basic body 221_1, the first connector 221_2, a first insertion portion 221_3, and a first rotary cam 221_4.

An upper surface (e.g., the surface disposed in the z axis direction) of the first basic body 221_1 may be formed flat. The first connector 221_2 may be disposed on a lower surface (e.g., a surface in the −z axis direction) of an upper edge (e.g., a y axis end) of the first basic body 221_1. The first connector 221_2 may include a hole that is opened in the fourth direction (e.g., the −x axis direction). The first fixing part 251 may be seated in and fixed to the first connector 221_2.

The first insertion portion 221_3 may be disposed on a lower surface (e.g., the surface in the −z axis direction) of a lower edge (e.g., the −y axis end) of the first basic body 221_1. The first insertion portion 221_3 may include a hole that is opened in the fourth direction (e.g., the −x axis direction). At least a portion in the hole may include a flat area and at least a portion of the hole may be angled. At least a portion of the first rotary shaft 231 may be seated at the first insertion portion 221_3. The first rotary cam 221_4 may be disposed on one side (e.g., the end in the x axis direction) of the first insertion portion 221_3.

The first rotary cam 221_4 may include at least one mountain and at least one valley disposed in a direction in which the first rotary shaft 231 is inserted into the first insertion portion 221_3 (e.g., the x axis direction). According to an embodiment, at least portions of the mountain and the valley of the first rotary cam 221_4 may include a flat area of a specific length. Accordingly, while the first rotary cam 221_4 is engaged with a first fixed cam 241_1a of the fixed cam part 241 and is rotated, a section, in which ends of a mountain of the first rotary cam 221_4 and a mountain of the first fixed cam 241_1a contact each other may be formed to have a specific width. When the section, in which the ends of the mountain of the first rotary cam 221_4 and the mountain of the first fixed cam 241_1a contact each other, is formed to have the specific width, a holding state of the first housing 110 and the second housing 120 at a specific angle may be maintained more firmly in the corresponding section, and holding states (e.g., a free-stop state) of various angle ranges may be provided.

The second arm part 222 may have substantially the same shape as that of the first arm part 221. For example, the second arm part 222 may include a second basic body 222_1, the second connector 222_2, a second insertion portion 222_3, and a second rotary cam 222_4. The second basic body 222_1 may be disposed to be symmetrical to the first basic body 221_1, and the second connector 222_2 may be coupled to one side of the second fixing part 252. The second insertion portion 222_3 may be inserted into the second rotary shaft 232, and the second rotary cam 222_4 may be engaged with a second fixed cam 241_1b of the fixed cam part 241.

One end of the first rotary shaft 231 may be seated in the first holding recess 213_2a formed in the fixing bracket 213, and the first rotary shaft 231 may be geared with the first idle gear 233, may be disposed to pass through the stopper 236, the first insertion portion 221_3, the first rotary cam 221_4 of the first arm part 221, the first fixed cam 241_1a of the fixed cam part 241, and the first elastic body 242a, and may be fixed to the support bracket 243. The first rotary shaft 231 may include a first shaft body 231_1, a first shaft gear 231_2 (or a first main gear), and the first seating part 231_3.

The first shaft body 231_1 may have a length, by which the first shaft body 231_1 passes through the stopper 236, the first insertion portion 221_3, the first rotary cam 221_4, the first fixed cam 241_1a, the first elastic body 242a, and a first support bracket 243_2a of the support bracket 243. The first shaft body 231_1 may be coupled to the first rotary cam 221_4, and may have a shape (e.g. flat shape), of which least a portion in the y axis cross-section is angled such that the first rotary cam 221_4 is rotated while the first shaft body 231_1 is rotated. For example, the first shaft body 231_1 may include a plurality of surfaces that are flat in a lengthwise direction (e.g., the x axis direction or the −x axis direction). In correspondence to this, an inner wall of the first insertion portion 221_3 in which the first rotary cam 221_4 is disposed may have a shape corresponding to a cross-section (e.g., the z axis cross-section) of the first shaft body 231_1. The first shaft gear 231_2 may be biased in the fourth direction (e.g., the −x axis direction) of the first shaft body 231_1. The first shaft gear 231_2 may be disposed to be geared with the first idle gear 233.

The first seating part 231_3 may protrude further to a surface in the fourth direction (e.g., the surface in the −x axis direction) of the first shaft gear 231_2. At least a portion of the first seating part 231_3 may pass through a guide hole formed in the support plate 235, and may be seated in the first holding recess 213_2a formed in the fixing bracket 213. Because the first fixing part 251 fixes the first rotary member 211 and the first arm part 221, the first seating part 231_3 may be firmly fixed to the first holding recess 213_2a, and may prevent separation or distortion of the first shaft body 231_1.

One end of the second rotary shaft 232 may be seated in the second holding recess 213_2b formed in the fixing bracket 213, and the second rotary shaft 232 may be geared with the second idle gear 234 and may be disposed to pass through the stopper 236, the second insertion portion 222_3, the second rotary cam 222_4, the second fixed cam 241_1b of the fixed cam part 241, and the second elastic body 242b, and an opposite end of the second rotary shaft 232 may be fixed to the support bracket 243. The second rotary shaft 232 may include a second shaft body 232_1, a second shaft gear 232_2 (or second main gear), and the second seating part 232_3.

The second shaft body 232_1 may have a length, by which the second shaft body 232_1 passes through the stopper 236, the second insertion portion 222_3, the second rotary cam 222_4, the second fixed cam 241_1b, the second elastic body 242b, and a second support bracket hole 243_2b of the support bracket 243. The second shaft body 232_1 may have substantially the same shape and size as the first shaft body 231_1. The second shaft body 232_1 may be disposed at a location that is spaced apart from the first shaft body 231_1 by a specific interval. The second shaft gear 232_2 may have the same shape as that of the first shaft gear 231_2, and may be disposed on the second shaft body 232_1. A disposition location of the second shaft gear 232_2 may be symmetrical to a disposition location of the first shaft gear 231_2. At least a portion of the second seating part 232_3 may have the same shape and size as those of the first seating part 231_3, and may be seated in the second holding recess 213_2b. In this process, at least a portion of the second seating part 232_3 may pass through the guide hole of the support plate 235, and may be seated in the second holding recess 213_2b. The second seating part 232_3 may be seated in the second holding recess 213_2b more firmly while the second rotary member 212 and the second arm part 222 are fixed with the second fixing part 252.

The second shaft body 232_1 may be coupled to the second rotary cam 222_4, and may have a shape (e.g. flat shape), of which least a portion in the y axis cross-section is angled such that the second rotary cam 222_4 is rotated while the second shaft body 232_1 is rotated. For example, the second shaft body 232_1 may include a plurality of surfaces that are flat in a lengthwise direction (e.g., the x axis direction or the −x axis direction). In correspondence to this, an inner wall of the second insertion portion 222_3 in which the second rotary cam 222_4 is disposed may have a shape corresponding to a cross-section (e.g., the z axis cross-section) of the second shaft body 232_1.

The stopper 236 may support at least portions of the first arm part 221 and the second arm part 222 such that the first arm part 221 and the second arm part 222 are not rotated by a specific limit angle or more or, when a pressure that deviates from a specific angle range is applied, the corresponding rotation pressure is offset. Furthermore, the stopper 236 may function to support one side of the fixed cam part 241 such that a pressure applied to the first arm part 221 and the second arm part 222 converges to 0 or becomes 0 within a specific range of the rotation range of the foldable electronic device 100. In this regard, according to an embodiment, the stopper 236 may include a stopper body 236_1, a stopper fixing hole 236_1a, a first wing part 236a, and a second wing part 236b.

According to an embodiment, at least a portion of the cross-section of the stopper body 236_1 in one direction may have a T shape. One side of the stopper body 236_1 may be disposed between the first wing part 236a and the second wing part 236b. An opposite side of the stopper body 236_1 may extend from one side of the stopper body 236_1 in the x axis direction. A stopper fixing hole 236_1a that passes through the stopper body 236_1 in the z axis direction may be disposed on a side of the stopper body 236_1. An opposite side of the stopper body 236_1 may include a first support portion 236_1b1 and a second support portion 236_1b2 that extend from the z axis in the −z axis direction, a first recess 236_1b3 (or a hole) formed between the first support portion 236_1b1 and the second support portion 236_1b2, a second recess 236_1b4 formed between one side of the stopper body 236_1 and the first support portion 236_1b1, and a third recess 236_1b5 formed between one side of the stopper body 236_1 and the second support portion 236_1b2.

The first support portion 236_1b1 and the second support portion 236_1b2 may have a structure, of which the z axis cross-section gradually increases as it goes from the z axis to the −z axis. Surfaces in the x axis direction of the first support portion 236_1b1 and the second support portion 236_1b2 may be located on the same plane with respect to the y axis, such that the lengths thereof extend from sides of the stopper body 236_1 in the y axis direction. The first recess 236_1b3, the second recess 236_1b4, or the third recess 236_1b5 may be disposed perpendicular with respect to the xy plane. The second recess 236_1b4 and the third recess 236_1b5 may be disposed in parallel to each other with respect to the y axis or be continuous to each other along the y direction. The stopper fixing hole 236_1a may be disposed at central portions of the first recess 236_1b3, the second recess 236_1b4, and the third recess 236_1b5 on the xy plane. Meanwhile, in the above description, the stopper body 236_1, in which the first recess 236_1b3, the second recess 236_1b4, and the third recess 236_1b5 are formed, has been described, but according to the other embodiments, at least one of the first recess 236_1b3, the second recess 236_1b4, and the third recess 236_1b5 may be removed. For example, the first recess 236_1b3 between the first support portion 236_1b1 and the second support portion 236_1b2 may be removed. In this case, the first support portion 236_1b1 and the second support portion 236_1b2 may be connected to each other to form one flat surface that faces the y axis.

The first wing part 236a may include a ring-shaped first wing 236a_1, a first shaft insertion hole 236a_2 that passes through a central portion of the first wing 236a_1 in the x axis direction, and a first stopper boss 236a_3 that restricts a rotational angle of the first arm part 221. One side of the first wing 236a_1 may be connected to one side of the stopper body 236_1, and may have a ring shape having a specific thickness in the x axis. The first shaft insertion hole 236a_2 may be formed at the center of the first wing 236a_1, and a portion of the first rotary shaft 231 may be inserted into and seated in the first shaft insertion hole 236a_2. The first stopper boss 236a_3 may protrude in the x axis direction in a partial area (e.g., an area that is adjacent to one side of the stopper body 236_1) of a surface of the first wing 236a_1 in the x axis direction. The first stopper boss 236a_3 may restrict a rotation range of one side of the first arm part 221 (e.g., a surface in the −x axis direction of the first insertion portion) while the first arm part 221 is rotated.

The second wing part 236b may include a ring-shaped second wing 236b_1, a second shaft insertion hole 236b_2 that passes through a central portion of the second wing 236b_1 in the x axis direction, and a second stopper boss 236b_3 that restricts a rotational angle of the second arm part 222. Similarly to the first wing 236a_1, one side of the second wing 236b_1 may be connected to one side of the stopper body 236_1, and the second wing 236b_1 may have a ring shape having a specific thickness in the x axis. The second wing 236b_1 may be disposed to be symmetrical to the first wing 236a_1 with respect to the center of the stopper body 236_1. The second shaft insertion hole 236b_2 may be formed at the center of the second wing 236b_1, and a portion of the second rotary shaft 232 may be inserted into and seated in the second shaft insertion hole 236b_2. The second shaft insertion hole 236b_2 may be disposed to be symmetrical to the first shaft insertion hole 236a_2 with respect to the center of the stopper body 236_1. The second stopper boss 236b_3 may have a size that is similar to or the same as that of the first stopper boss 236a_3, may protrude in the same direction, for example, in the x axis direction, and may be disposed to be symmetrical to the first stopper boss 236a_3 with respect to the center of the stopper body 236_1. The second stopper boss 236b_3 may restrict a rotation range of one side of the second arm part 222 while the second arm part 222 is rotated.

The first wing part 236a and the second wing part 236b may be disposed such that sides (e.g., surfaces in the x axis direction) face a fourth direction surface (e.g., a surface in the −x axis direction) of the first insertion portion 221_3 of the first arm part 221 and a fourth direction surface (e.g., a surface in the −x axis direction) of the second insertion portion 222_3. A third direction surface (e.g., at least a partial area of the x axis direction) of the stopper body 236_1 may be disposed to face a fourth direction surface (e.g., at least a partial area of the −x axis direction) of a cam body 241_1 of the fixed cam part 241.

The fixed cam part 241 (or fixed cam unit, fixed cam portion) may include the cam body 241_1, the first fixed cam 241_1a, the second fixed cam 241_1b, a first cam hole 241_2a, and a second cam hole 241_2b. The cam body 241_1 may have a specific length, and the first fixed cam 241_1a and the second fixed cam 241_1b may be disposed on opposite edges. At least an area of a fourth direction surface (e.g., a surface in the −x axis direction) of the cam body 241_1 may be disposed to face at least one surface of a third direction surface (e.g., a surface in the x axis direction) of the stopper body 236_1. A mountain and a valley of the first fixed cam 241_1a may be disposed in the fourth direction (e.g., the −x axis direction), and the first cam hole 241_2a may be formed at a central portion thereof such that the first rotary shaft 231 passes through. The first fixed cam 241_1a may be disposed to be engaged with the first rotary cam 221_4. At least one surface of a third direction surface (e.g., a surface in the x axis direction) of the first fixed cam 241_1a may contact one side of the first elastic body 242a. The second fixed cam 241_1b may be disposed in the same direction as that of that of the first fixed cam 241_1a, and may be spaced apart from the first fixed cam 241_1a by a y axis length of the cam body 241_1. The second fixed cam 241_1b may be disposed to be engaged with the second rotary cam 222_4, and one side of the second elastic body 242b may contact at least an area of a third direction surface (e.g., a surface in the x axis direction) of the second fixed cam 241_1b. The second cam hole 241_2b may be formed at a central portion of the second fixed cam 241_1b such that the second rotary shaft 232 passes therethrough. The second cam hole 241_2b may have a shape that is the same as or similar to that of the first cam hole 241_2a. For example, z axis cross-sections of the second cam hole 241_2b and the first cam hole 241_2a may be circular such that the first rotary shaft 231 and the second rotary shaft 232 are not rotated together while being rotated. According to an embodiment, the fixed cam part 241 may retreat in the third direction (e.g., the x axis direction) by forces exerted by the first rotary cam 221_4 and the second rotary cam 222_4 while the first arm part 221 and the second arm part 222 are rotated within a specific angle range, and may move in the fourth direction (e.g., the −x axis direction) by elasticity of the first elastic body 242a and the second elastic body 242b and return (e.g., linearly move in the x axis direction) to an original location when the mountains and the valleys of the cams are engaged with each other.

The first elastic body 242a may be a shape having a hollow central portion. The first shaft body 231_1 of the first rotary shaft 231 that passes through the first fixed cam 241_1a may be seated at a central portion of the first elastic body 242a. The first elastic body 242a and the second elastic body 242b may be disposed between the fixed cam part 241 and the support bracket 243, and may function to push the fixed cam part 241 in the fourth direction (e.g., the −x axis direction) as the support bracket 243 is fixed. The second elastic body 242b may be disposed to be spaced apart from the first elastic body 242a by a specific interval, and may be disposed to contact a third direction surface (e.g., the x axis direction surface) of the second fixed cam 241_1b.

According to an embodiment, an additional structure 260 may be disposed between an area (e.g., an area of the stopper 236 in the x axis direction, and an area on an opposite side of the stopper body 236_1) of the stopper 236 and the fixed cam part 241. The additional structure 260, for example, may have a shape that is the same as or similar to the shape of an area of the stopper body 236_1 (e.g., a shape of a surface of an area of the stopper body 236_1 extending in the x axis direction or facing the x axis direction). Furthermore, the additional structure 260 may have a shape corresponding to an area of a surface of the cam body 241_1 of the fixed cam part 241, which faces the stopper 236 (e.g., at least an area of a surface of the cam body 241_1 facing the −x axis). Because the additional structure 260 is disposed between the stopper 236 and the fixed cam part 241, pressures of the elastic bodies 242a and 242b applied between the first rotary cam 221_4 of the first arm part 221 and the first fixed cam 241_1a and between the second rotary cam 222_4 of the second arm part 222 and the second fixed cam 241_1b may become 0 (e.g., in a state in which the first rotary cam 221_4 and the first fixed cam 241_1a do not contact each other) or a value that converges to 0 (e.g., in a state in which the first rotary cam 221_4 and the first fixed cam 241_1a slightly contact each other such that pressure that is lower than the pressure that would be applied by the elastic bodies 242a and 242b otherwise) when the foldable electronic device 100 is in a specific state (e.g., the closed state). In this regard, the additional structure 260 may be made of a material that may maintain a specific interval between the stopper 236 and the fixed cam part 241, for example, a material having a strength (or hardness), by which an external shape thereof is not deformed by pressing forces of the elastic bodies 242a and 242b. For example, the additional structure 260 may be made of plastic, wood, or metallic material having sufficient hardness. Furthermore, the additional structure 260 may be made of a material, by which pressing forces of the elastic bodies 242a and 242b may be reduced even when an external shape thereof is deformed. For example, the additional structure 260 may be made of a polymer material that returns to an original shape, paper material, rubber material, cotton flannel material, or metallic material (e.g., a leaf spring) having an elastic force. The additional structure 260 may remove at least a portion of a pressure applied between the rotary cams 221_4 and 222_4 and the fixed cams 241_1a and 241_2b when the foldable electronic device 100 is in the closed state, and thus may cause the first rotary member 211 and the second rotary member 212 connected to the first arm part 221 and the second arm part 222 to be more easily rotated. Accordingly, a user may widen a gap between the first housing 110 and the second housing 120 at a specific angle by applying only a force that is strong enough to release a magnetic force of the magnet member 128 disposed in the first housing 110 or the second housing 120. In this way, in certain embodiments disclosed herein, the user may open the foldable electronic device 100 from the closed state with one hand or release the closed state of the foldable electronic device 100 by using a relatively low force.

The support bracket 243 may include a support portion 243_1, a first support bracket hole 243_2a, and the second support bracket hole 243_2b. The support portion 243_1 may include a through-hole 243_1a that passes therethrough upwards and downwards (e.g., the −z axis direction at one z axis point). The through-hole 243_1a may be used to fix the support bracket 243 to the hinge housing 150. The first support bracket hole 243_2a may be disposed to protrude from one side of the support portion 243_1, and may support one side of the first elastic body 242a. Furthermore, one end of the first rotary shaft 231 may be inserted into the first support bracket hole 243_2a. The second support bracket hole 243_2b may be disposed at a location that is spaced apart from the first support bracket hole 243_2a by a specific distance, may be disposed to protrude from one side of the support portion 243_1, and may support one side of the second elastic body 242b. Furthermore, one end of the second rotary shaft 232 may be inserted into the second support bracket hole 243_2b.

The first idle gear 233 may be disposed between the first shaft gear 231_2 and the second shaft gear 232_2, and one side thereof may be geared with the first shaft gear 231_2 and an opposite side thereof may be geared with the second idle gear 234. The first idle gear 233 may include a boss inserted into the guide hole formed in the support plate 235, and a boss fixed to a fourth direction surface (e.g., a surface in the −x direction) of the stopper 236.

The second idle gear 234 may be disposed between the first shaft gear 231_2 and the second shaft gear 232_2, and one side thereof may be geared with the first idle gear 233 and an opposite side thereof may be geared with the second shaft gear 232_2. The second idle gear 234 may have substantially the same shape and size as those of the first idle gear 233. Accordingly, the second idle gear 234 may include a boss inserted into the guide hole formed in the support plate 235, and a boss fixed to a fourth direction surface (e.g., a surface in the −x direction) of the stopper 236. In this regard, recesses or holes for holding the boss of the first idle gear 233 and the boss of the second idle gear 234 may be formed on a fourth direction surface (e.g., a surface in the −x axis direction) of the stopper 236.

The support plate 235 may be disposed between the fixing bracket 213 and the rotary shafts 231 and 232, and may be disposed to prevent separation of the rotary shafts 231 and 232 and the idle gears 233 and 234. In this regard, the support plate 235 may include a plurality of guide holes. For example, the support plate 235 may include a guide hole, through which the first seating part 231_3 of the first rotary shaft 231 passes, a guide hole, through which the second seating part 232_3 of the second rotary shaft 232 passes, and guide holes (or guide grooves), in which the boss of the first idle gear 233 and the bosses of the second idle gear 234 are seated.

The plurality of fixing clips 291_1, 291_2, 292_1, 292_2, 249_1, and 249_2 may be disposed such that at least one component included in the first hinge structure 200a may rotate while other components may be fixed so that they do not deviate from their locations. The plurality of fixing clips 291_1, 291_2, 292_1, 292_2, 249_1, and 249_2, for example, may include an E clip or a C clip. The plurality of fixing clips 291_1, 291_2, 292_1, 292_2, 249_1, and 249_2, for example, may include the first fixing clip 291_1 for fixing the first fixing part 251 to a third direction surface (e.g., a surface in the x axis direction) of the first connector 221_2, the second fixing clip 291_2 for fixing the second fixing part 252 to a third direction surface (e.g., a surface in the x axis direction) of the second connector 222_2, the third fixing clip 292_1 coupled to the first seating part 231_3 of the first rotary shaft 231 such that the first seating part 231_3 does not deviate from the support plate 235, the fourth fixing clip 292_2 coupled to the second seating part 232_3 of the second rotary shaft 232 such that the second seating part 232_3 does not deviate from the support plate 235, the a fifth fixing clip 249_1 coupled to an end of the first rotary shaft 231 such that the first rotary shaft 231 does not deviate from the first support bracket hole 243_2a of the support bracket 243, and the sixth fixing clip 249_2 coupled to an end of the second rotary shaft 232 such that the second rotary shaft 232 does not deviate from the second support bracket hole 243_2b of the support bracket 243.

Figure 3:
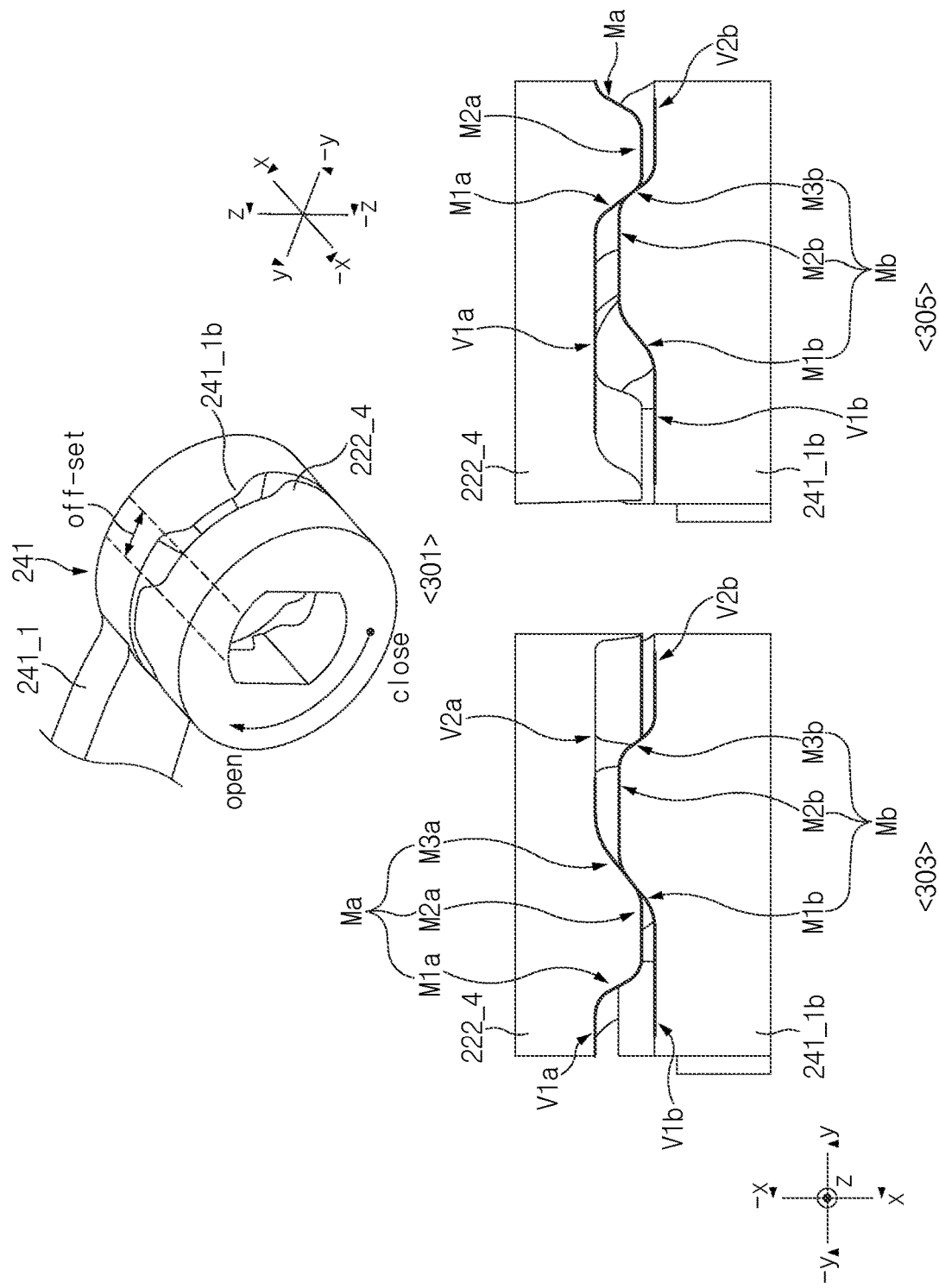
FIG. 3 is a view illustrating an example of shapes and disposition forms of a rotary cam and a fixed cam according to an embodiment.

FIG. 3 is a view illustrating an example of shapes and disposition forms of a rotary cam and a fixed cam according to an embodiment. The rotary cam illustrated in FIG. 3 may correspond to the second rotary cam 222_4 illustrated in FIG. 2, and the fixed cam may correspond to the second fixed cam 241_1b illustrated in FIG. 2. The following description will be made with reference to the second rotary cam 222_4 and the second fixed cam 241_1b, but the same structure may be applied to the first rotary cam 221_4 and the first fixed cam 241_1a. In the following description, at least portions of the mountains and valleys of the rotary cam and the fixed cam may be symmetrical to each other. In the following description, according to the disposition state of the foldable electronic device 100, disposition of the rotary cam and the fixed cam will be described with reference to some mountains and valleys shown through the drawings.

Referring to FIGS. 1A to 3, referring to state 301 to state 305, the second rotary cam 222_4 may include at least a first mountain Ma, and a first valley V1a and a second valley V2a disposed on opposite sides of the first mountain Ma. Additionally, the second rotary cam 222_4 may further include two or more mountains and one or more valleys. The second fixed cam 241_1b may include at least one second mountain Mb, and a third valley V1b and a fourth valley V2b disposed on opposite sides of the second mountain Mb. Additionally, the second fixed cam 241_1b may further include two or more mountains and one or more valleys.

Referring to state 303, the first mountain Ma may include a first inclined surface M1a of a specific size, which extends from one side (e.g., a y axis end) of the first valley V1a and has a first inclination that is larger than 0 in the x axis direction on the xy axis plane (or when viewed in the z axis direction on the xy axis plane), a second inclined surface M2a of a specific size, which extends from an end (e.g., a y axis end) of one side of the first inclined surface M1a and has an inclination of 0 (or an inclination that is smaller than the first inclination), and a third inclined surface M3a of a specific size, which extends from an end (e.g., a y axis end) of one side of the second inclined surface M2a to an end (e.g., a −y axis end) of one side of the second valley V2a and has a third inclination. According to an embodiment, the first inclination may be larger than the third inclination. The second inclination may be smaller than the third inclination. The length of the first inclined surface M1a may be smaller than the length of the third inclined surface M3a.

The second mountain Mb may include a fourth inclined surface M1b of a specific size, which extends from one side (e.g., a y axis end) of the third valley V1b and has a fourth inclination that is larger than 0 in the −x axis direction on the xy axis plane (or when viewed in the z axis direction on the xy axis plane), a fifth inclined surface M2b of a specific size, which extends from an end (e.g., a y axis end) of one side of the fourth inclined surface M1b and has an inclination of 0 (or an inclination that is smaller than the fourth inclination), and a sixth inclined surface M3b of a specific size, which extends from an end (e.g., a y axis end) of one side of the fifth inclined surface M2b to an end (e.g., a −y axis end) of one side of the fourth valley V2b and has a sixth inclination. According to an embodiment, the fourth inclination may be smaller than the sixth inclination (for example, the fourth inclined surface M1b may have an inclination that is smoother than the sixth inclined surface M3b). The fifth inclination may be smaller than the fourth inclination. The length of the fourth inclined surface M1b may be smaller than the length of the sixth inclined surface M3b. According to various embodiments, the fourth inclined surface M1b may have a size and an inclination corresponding to those of the first inclined surface M1a. The sixth inclined surface M3b may have a size and an inclination corresponding to those of the first inclined surface M1a. The third inclined surface M3a may have a size and an inclination corresponding to those of the fifth inclined surface M2b.

As in state 301, when the foldable electronic device 100 is in the closed state, the first mountain Ma of the second rotary cam 222_4 may be disposed to face a specific area of the third valley V1b of the second fixed cam 241_1b, and the first valley V1a of the second rotary cam 222_4 may be disposed to face a specific area of the second mountain Mb of the second fixed cam 241_1b. According to an embodiment, the first mountain Ma of the second rotary cam 222_4 and the second mountain Mb of the second fixed cam 241_1b, as illustrated, may be spaced apart from each other by an offset section (or distance). The offset section, for example, may be implemented by the additional structure 260 so that the first mountain Ma and the third valley V1b (or the second mountain Mb and the second valley V2a) do not contact each other. In relation to the offset section, while the foldable electronic device 100 is opened by a specific angle from the closed state (for example, an interval between the first mountain Ma and the second mountain Mb is reduced as the arm part is rotated), the foldable electronic device 100 may be in a state, in which the pressing of the elastic bodies 242a and 242b is reduced or reduced. When the pressing by the elastic bodies 242a and 242b disappears or is reduced, the user may release the closed state with a force (e.g., a force that is strong enough to release an attractive force by the magnet member 128 formed on one side of the first housing 110 or the second housing 120) while the foldable electronic device 100 is opened by a specific angle in the closed state. Furthermore, the user may release the closed state of the foldable electronic device 100 by using only the force that is the difference between the force applied to change the folded state of the display 160 to the unfolded state and the attractive force by the magnet member 128.

When the first rotary member 211 and the second rotary member 212 are rotated in correspondence to rotation of the first housing 110 or the second housing 120 and the first arm part 221 and the second arm part 222 are rotated in correspondence, as in state 303, the third inclined surface M3a of the first mountain Ma and the fourth inclined surface M1b of the second mountain Mb may contact each other. As the third inclined surface M3a and the fourth inclined surface M1b, which have relatively smooth inclinations as compared with the first inclined surface M1a or the sixth inclined surface M3b, contact each other, a specific holding state section (e.g., a free-stop, a section, in which a current holding state is maintained even though an additional pressure is not applied) may be reached from the closed state by applying a relatively low force. As described above, even though a torque is generated in a counterclockwise direction of the second rotary cam 222_4 with respect to the −x axis as the third inclined surface M3a and the fourth inclined surface M1b contact each other while the pressing by the elastic bodies 242a and 242b are made in the −x axis, the third inclined surface M3a and the fourth inclined surface M1b are relatively smooth, and thus the user may change the state of the foldable electronic device 100 from the closed state to the unfolded state (or the unfolding angle may become larger) with a relatively lower force as compared with the state, in which the first inclined surface M1a and the sixth inclined surface M3b contact each other.

After state 303, when an additional force is applied in a direction, in which the foldable electronic device 100 is opened, the foldable electronic device 100 may be in a fully unfolded state (e.g., a state, in which the display 160 forms 180 degrees or an angle that is close thereto). When the foldable electronic device 100 is in state 305 that is the fully unfolded state, the first inclined surface M1a of the first mountain Ma and the sixth inclined surface M3b of the second mountain Mb may contact each other. Then, the pressing by the elastic members 242a and 242b is made in the −x axis direction, a torque of the second rotary cam 222_4 due to a contact of the first inclined surface M1a and a sixth inclined surface M3b may be applied in a clockwise direction. Then, as the first inclined surface M1a and the sixth inclined surface M3b contact each other while having a relatively large inclination, the foldable electronic device 100 may maintain the fully unfolded state more firmly. When the state of the foldable electronic device 100 is changed from the fully unfolded state to a holding state (e.g., a free-stop state) of a specific angle (or the foldable electronic device 100 is folded), the second rotary cam 222_4 may be rotated in a counterclockwise direction.

Figure 4A:
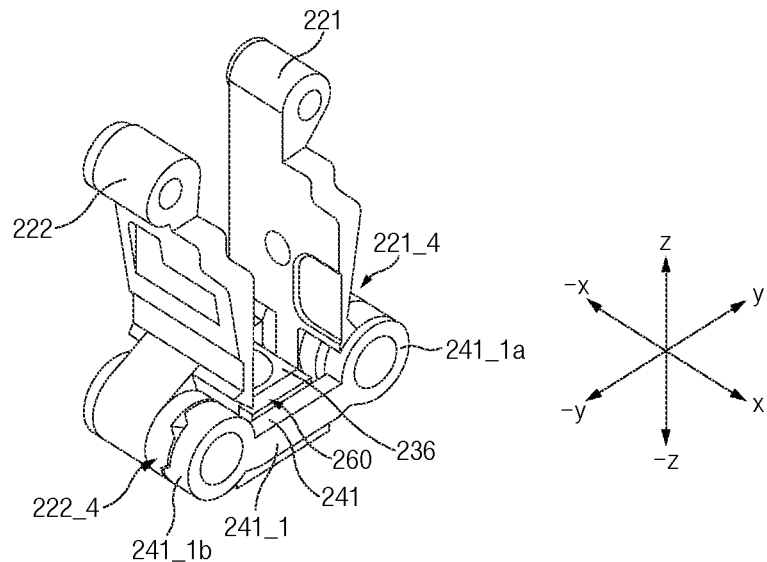
FIG. 4A is a view illustrating a disposition state of a portion of a hinge structure in a closed state of a foldable electronic device according to an embodiment.
Figure 4A:
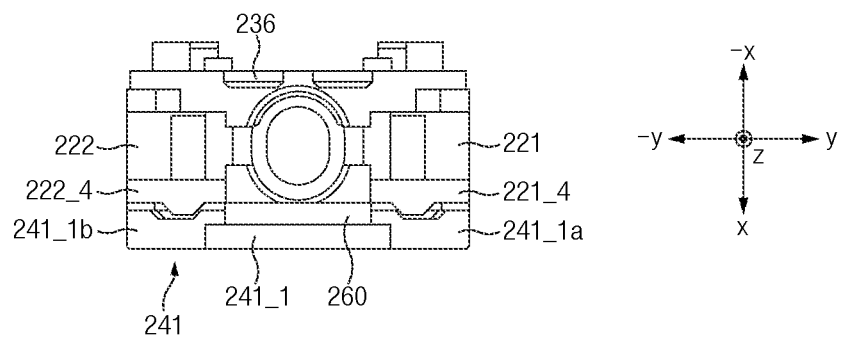
Figure 4A:
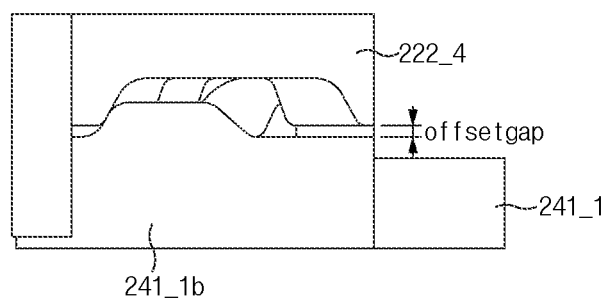

FIG. 4A is a view illustrating a disposition state of a portion of a hinge structure in a closed state of a foldable electronic device according to an embodiment.

Referring to FIGS. 2 to 4A, the foldable electronic device 100 may include at least the first arm part 221, the second arm part 222, the fixed cam part 241, and the stopper 236. Additionally, the foldable electronic device 100 may include the elastic bodies 242a and 242b, and the elastic bodies 242a and 242b may provide an elastic force in the −x axis direction. Accordingly, as in state 401, the fixed cam part 241, and the first rotary cam 221_4 of the first arm part 221 and the second rotary cam 222_4 of the second arm part 222 may face each other. When the foldable electronic device 100 is in the closed state, the first arm part 221 and the second arm part 222 are disposed to be parallel to each other in the z axis direction, or an angle between the first arm part 221 and the second arm part 222 may become a specific angle or less.

As in state 403, when the foldable electronic device 100 is in the closed state, the cam body 241_1 of the fixed cam part 241 and the additional structure 260 may contact each other. When the cam body 241_1 contacts the additional structure 260, the elastic force applied to the fixed cam part 241 may be delivered to the additional structure 260 through the cam body 241_1. Accordingly, because the first rotary cam 221_4 and the first fixed cam 241_1a and the second rotary cam 222_4 and the second fixed cam 241_1b are in a noncontact state or a portion of the pressure applied by the elastic force is delivered to the additional structure 260 even when they contact each other, only the remaining portions of the pressure applied to the elastic force may be delivered.

According to an embodiment, even when the elastic forces of the elastic bodies 242a and 242b are delivered in the x axis direction as in state 405, the additional structure 260 of the stopper 236 supports the cam body 241_1, whereby a specific gap (e.g., an offset gap) may be formed between the second rotary cam 222_4 and the second fixed cam 241_1b. Similarly, a specific gap may be also formed between the first rotary cam 221_4 and the first fixed cam 241_1a like the gap between the second rotary cam 222_4 and the second fixed cam 241_1b. Because the second rotary cam 222_4 and the second fixed cam 241_1b are in a noncontact state while the second arm part 222 is rotated by a specific angle in a counterclockwise direction from the closed state with respect to the x axis (or the first rotary cam 221_4 and the first fixed cam 241_1a are in a noncontact state while the first arm part 221 is rotated by a specific angle in a clockwise direction), the closed state of the foldable electronic device 100 may be released by the user in the state where the pressure by the elastic bodies 242a and 242b is released.

Figure 4B:
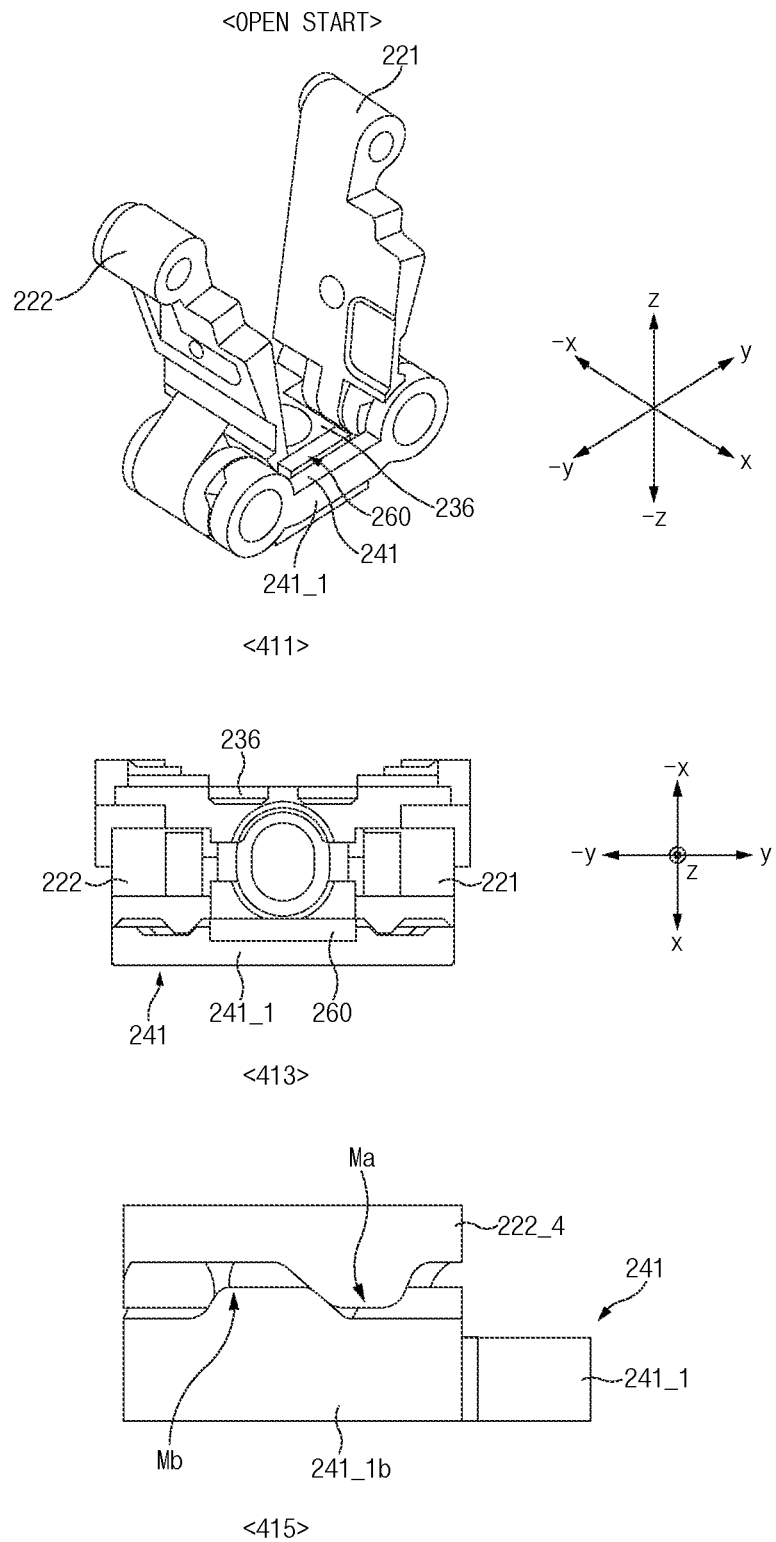
FIG. 4B is a view illustrating a disposition state of a portion of a hinge structure in a first angle unfolded state of a foldable electronic device according to an embodiment.

FIG. 4B is a view illustrating a disposition state of a portion of a hinge structure in a first angle unfolded state of a foldable electronic device according to an embodiment.

Referring to FIGS. 2 to 4B, the foldable electronic device 100 may include at least the first arm part 221, the second arm part 222, the fixed cam part 241, and the stopper 236. Additionally, the foldable electronic device 100 may include the elastic bodies 242a and 242b, and the elastic bodies 242a and 242b may provide an elastic force in the −x axis direction. Accordingly, as in state 411, the fixed cam part 241, and the first rotary cam 221_4 of the first arm part 221 and the second rotary cam 222_4 of the second arm part 222 may face each other. When the foldable electronic device 100 is unfolded at a first angle after the closed state, an angle between the first arm part 221 and the second arm part 222 may be larger than an angle between the first arm part 221 and the second arm part 222 of FIG. 4A.

Referring to state 413 and state 415, when the foldable electronic device 100 is unfolded at a specific angle or more from the closed state, the cam body 241_1 of the fixed cam part 241 and the additional structure 260 may be in a noncontact state. Furthermore, pressures of the elastic bodies 242a and 242b delivered to the additional structure 260 through the cam body 241_1 may be lower than those in the closed state. The second rotary cam 222_4 may be rotated in a counterclockwise direction with respect to the −x axis, and the second fixed cam 241_1b may be in a fixed state. Correspondingly, a portion of the mountain Ma of the second rotary cam 222_4 and a portion of the mountain Mb of the second fixed cam 241_1b may contact each other. According to an embodiment, an inclined surface of the mountain Ma of the first rotary cam 221_4, which has a relatively smooth inclination, may contact an inclination of the mountain Mb of the first fixed cam 241_1a, which has a relatively smooth inclination. In the same way, a portion of the mountain of the first rotary cam 221_4 and a portion of the mountain of the first fixed cam 241_1a may contact each other. As an inclined surface of the mountain Ma of the second rotary cam 2224 and an inclined surface of the mountain Mb of the second fixed cam 241_1b contact each other, the elastic forces applied to the elastic bodies 242a and 242b may be applied to the contact surfaces (the contact surfaces of the first rotary cam 221_4 and the first fixed cam 241_1a) of the second rotary cam 222_4 and the second fixed cam 241_1b.

Figure 4C:
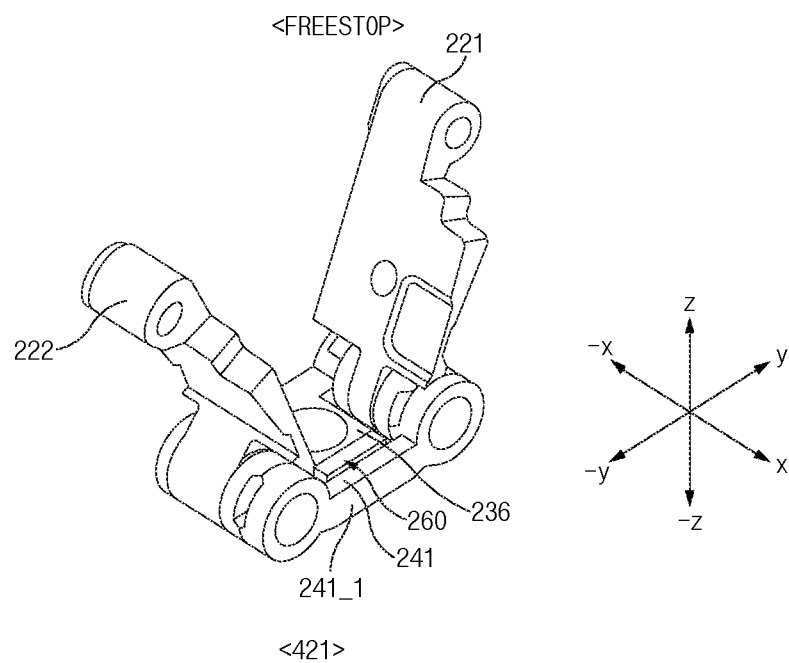
FIG. 4C is a view illustrating a disposition state of a portion of a hinge structure in a second angle unfolded state of a foldable electronic device according to an embodiment.
Figure 4C:
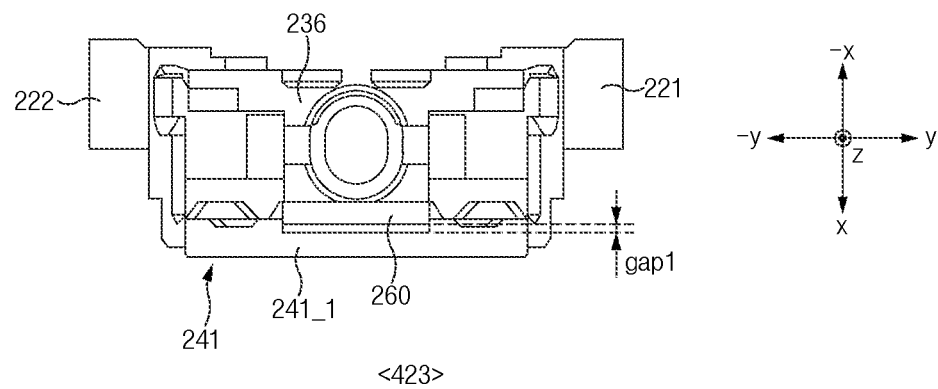
Figure 4C:
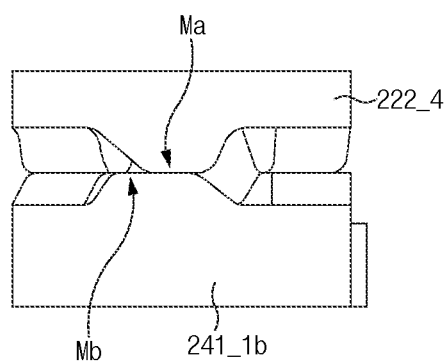

FIG. 4C is a view illustrating a disposition state of a portion of a hinge structure in a second angle unfolded state of a foldable electronic device according to an embodiment.

Referring to FIGS. 2 to 4C, the foldable electronic device 100 may include at least the first arm part 221, the second arm part 222, the fixed cam part 241, and the stopper 236. Additionally, the foldable electronic device 100 may include the elastic bodies 242a and 242b, and the elastic bodies 242a and 242b may provide an elastic force in the −x axis direction. Accordingly, as in state 421, the fixed cam part 241, and the first rotary cam 221_4 of the first arm part 221 and the second rotary cam 222_4 of the second arm part 222 may face each other. When the foldable electronic device 100 is unfolded by an angle that is larger than the angle between the first arm part 221 and the second arm part 222 described in FIG. 4B, a second angle between the first arm part 221 and the second arm part 222 may be larger than the first angle in FIG. 4B.

As in state 423 and state 425, when the first arm part 221 and the second arm part 222 are in an unfolded state of the second angle, a gap gap1 between the cam body 241_1 of the fixed cam part 241 and the additional structure 260 may be larger than that in FIG. 4B. Furthermore, the gap gap1 between the cam body 241_1 and the additional structure 260 may be a maximum size that is allowed in the hinge structure. In this operation, a portion of an apex of the mountain Ma of the second rotary cam 222_4 and a portion of an apex of the mountain Mb of the second fixed cam 241_1b may be in a contact state. In a state, in which the gap gap1 is maximum or in a state, in which the apex of the mountain Ma and the apex of the mountain Mb contact each other, pressing or compacting of the elastic bodies 242a and 242b may be at a maximum. When the apex of the mountain Ma and the apex of the mountain Mb maintain contact while the second rotary cam 222_4 is rotated about the –x axis, the foldable electronic device 100 may maintain a holding state (e.g., a free stop) in a specific range of the current state even when there is no additional pressure.

Figure 4D:
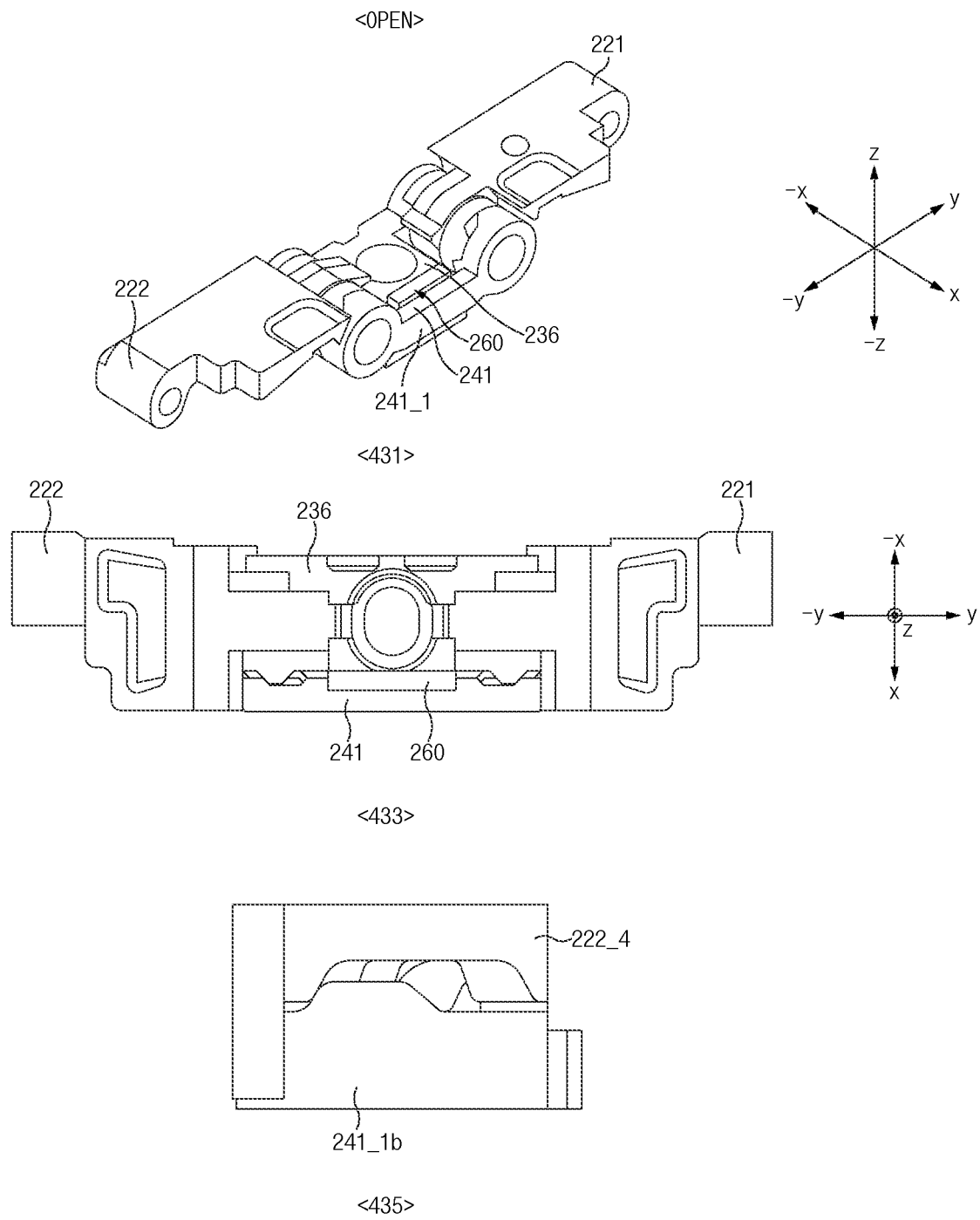
FIG. 4D is a view illustrating a disposition state of a portion of a hinge structure in a fully unfolded state of a foldable electronic device according to an embodiment.

FIG. 4D is a view illustrating a disposition state of a portion of a hinge structure in a fully unfolded state of a foldable electronic device according to an embodiment.

Referring to FIGS. 2 to 4D, the foldable electronic device 100 may include at least the first arm part 221, the second arm part 222, the fixed cam part 241, and the stopper 236. Additionally, the foldable electronic device 100 may include the elastic bodies 242a and 242b, and the elastic bodies 242a and 242b may provide an elastic force in the –x axis direction. Accordingly, as in state 431, the fixed cam part 241, and the first rotary cam 221_4 of the first arm part 221 and the second rotary cam 222_4 of the second arm part 222 may face each other. The foldable electronic device 100 may be in a fully unfolded state as the angle between the first arm part 221 and the second arm part 222 is 180 degrees or an angle (e.g., 170 to 190 degrees) that is close to 180 degrees.

As in state 433 and state 435, when the first arm part 221 and the second arm part 222 are in a fully unfolded state, the cam body 241_1 of the fixed cam part 241 and the additional structure 260 may be a near contact state. Furthermore, even when a gap between the cam body 241_1 of the fixed cam part 241 and the additional structure 260 is formed, a gap that is smaller than the gap gap1 in the second angle state of the foldable electronic device 100 may be formed. In the above-described structure, the first stopper boss 236a_3 and the second stopper boss 236b_3 formed in the stopper 236 may support the first arm part 221 and the second arm part 222 to prevent further rotation in the –z axis direction (e.g., the clockwise direction for the first arm part 221 and the counterclockwise direction for the second arm part 222).

In the fully unfolded state, another inclined surface (an inclined surface having a relatively large inclination) of the mountain Ma of the second rotary cam 222_4 and another inclined surface (an inclined surface having a relatively large inclination) of the mountain Mb of the second fixed cam 241_1b may be in contact, as shown in 435. Accordingly, a torque of the second rotary cam 222_4 may be applied in the counterclockwise direction (e.g., a direction, in which the display 160 or the foldable electronic device 100 is fully unfolded). Similarly, a torque of the first rotary cam 221_4 may be applied in the clockwise direction (e.g., a direction, in which the display 160 or the foldable electronic device 100 is fully unfolded). Accordingly, the foldable electronic device 100 may maintain the fully unfolded state more firmly.

Figure 5:
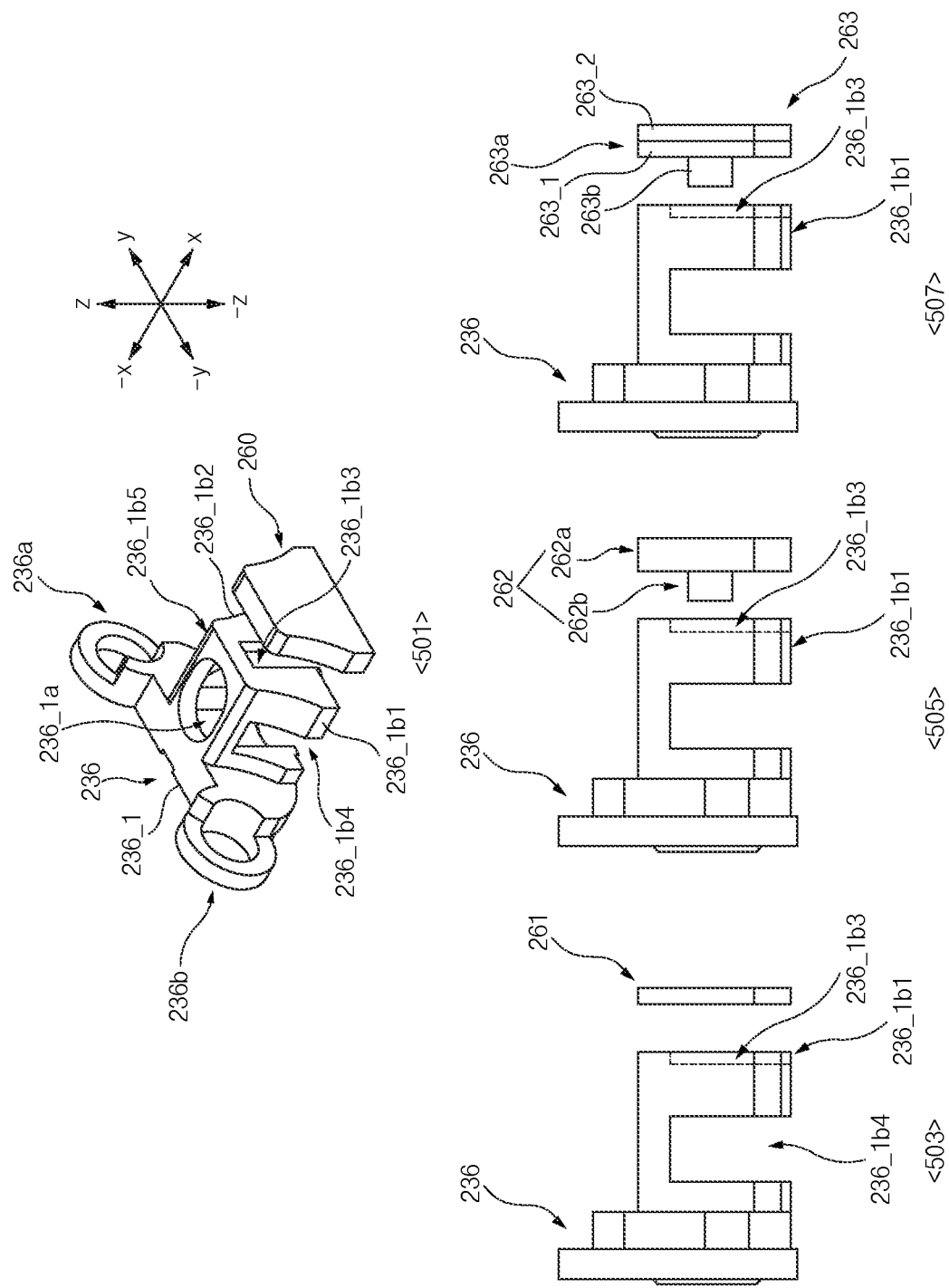
FIG. 5 is a view illustrating examples of various forms of an additional structure according to various embodiments.

FIG. 5 is a view illustrating examples of various forms of an additional structure according to various embodiments.

Referring to FIG. 5, the stopper 236 according to the embodiment may include the stopper body 236_1, the stopper fixing hole 236_1a, the first wing part 236a, and the second wing part 236b. At least a portion of a cross-section of the stopper body 236_1 in one direction, as described above, may have a T shape. One side of the stopper body 236_1 may be disposed between the first wing part 236a and the second wing part 236b. An opposite side of the stopper body 236_1 may extend from one side of the stopper body 236_1 in the x axis direction. An opposite side of the stopper body 236_1 may include a first support portion 236_1b1 and the second support portion 236_1b2 that extend from the z axis in the –z axis direction, the first recess 236_1b3 (or a hole) formed between the first support portion 236_1b1 and the second support portion 236_1b2, the second recess 236_1b4 formed between one side of the stopper body 236_1 and the first support portion 236_1b1, and the third recess 236_1b5 formed between one side of the stopper body 236_1 and the second support portion 236_1b2.

Referring to state 501 and state 503, a first additional structure 261 may have a specific thickness in the x axis, a surface of the first additional structure 261, which faces the x axis or the –x axis, may be flat, and a width of the first additional structure 261 from the z axis to the –z axis may be different according to a location thereof. For example, the width of the first additional structure 261 becomes gradually smaller as it goes from the –z axis to the z axis. At least a portion of the above-described shape of the first additional structure 261 may include a shape corresponding to a surface of the stopper body 236_1 which faces the x axis. The first additional structure 261, for example, may be made of plastic having a specific strength.

Referring to state 501 and state 505, a second additional structure 262 may include a support body 262a having a specific thickness in the x axis direction, and of which a surface facing the x axis or the –x axis is flat, and a coupling boss 262b protruding from one side of the support body 262a in the –x axis direction. Although it is illustrated that a thickness of the support body 262a of the second additional structure 262 may be larger than a thickness of the first additional structure 261 in state of 503, embodiments of the disclosure are not limited thereto. A thickness of the support body 262a may vary in correspondence to rotational angles of the first arm part 221 and the second arm part 222, by which the pressures applied to the elastic bodies 242a and 242b are prevented from being applied. At least a portion of the coupling boss 262b may be held in the first recess 236_1b3 of the stopper body 236_1. Because the above-described coupling boss 262b of the second additional structure 262 is inserted into the first recess 236_1b3 of the stopper body 236_1, movement of the second additional structure 262 may be prevented more effectively while the second additional structure 262 and the cam body 241_1 of the fixed cam part 241 are in a contact or noncontact state. According to an embodiment, a bonding member may be further disposed between the above-described second additional structure 262 and the stopper body 236_1.

Referring to state 501 and state 507, similarly to the second additional structure described in state 505, a third additional structure 263 may include a support body 263a and a coupling boss 263b. The support body 263a may include a first support body 263_1 having a surface facing the x axis or the –x axis that is flat, contacting the stopper body 236_1, and a second support body 263_2 disposed in parallel to the first support body 263_1 and contacting the cam body 241_1. The first support body 263_1 and the second support body 263_2 have the same size. Furthermore, the first support body 263_1 and the second support body 263_2 have different materials or different sizes. The first support body 263_1 may be bonded to the stopper body 236_1 more firmly, and may be made of a material (e.g., plastic) that may support the cam body 241_1. The second support body 263_2 may be made of a material (e.g., at least one of cotton flannel, leather, sponge, and an adhesive material as a material having a specific elasticity) that may reduce noise that may be generated by the contact with the cam body 241_1. According to an embodiment, at least one of a bonding member, a bonding layer, or a bonding tape may be disposed between the first support body 263_1 and the stopper body 236_1 or between the first support body 263_1 and the second support body 263_2. Furthermore, the first support body 263_1 and the second support body 263_2 may be bonded to each other through thermal curing, and a bonding layer may be formed between the first support body 263_1 and the stopper body 236_1. According to formed, the third additional structure 263 may include the first support body 263_1 of a first material, from which the coupling boss may be removed, and the second support body 263_2 of a second material that is different from the first material.

Figure 6:
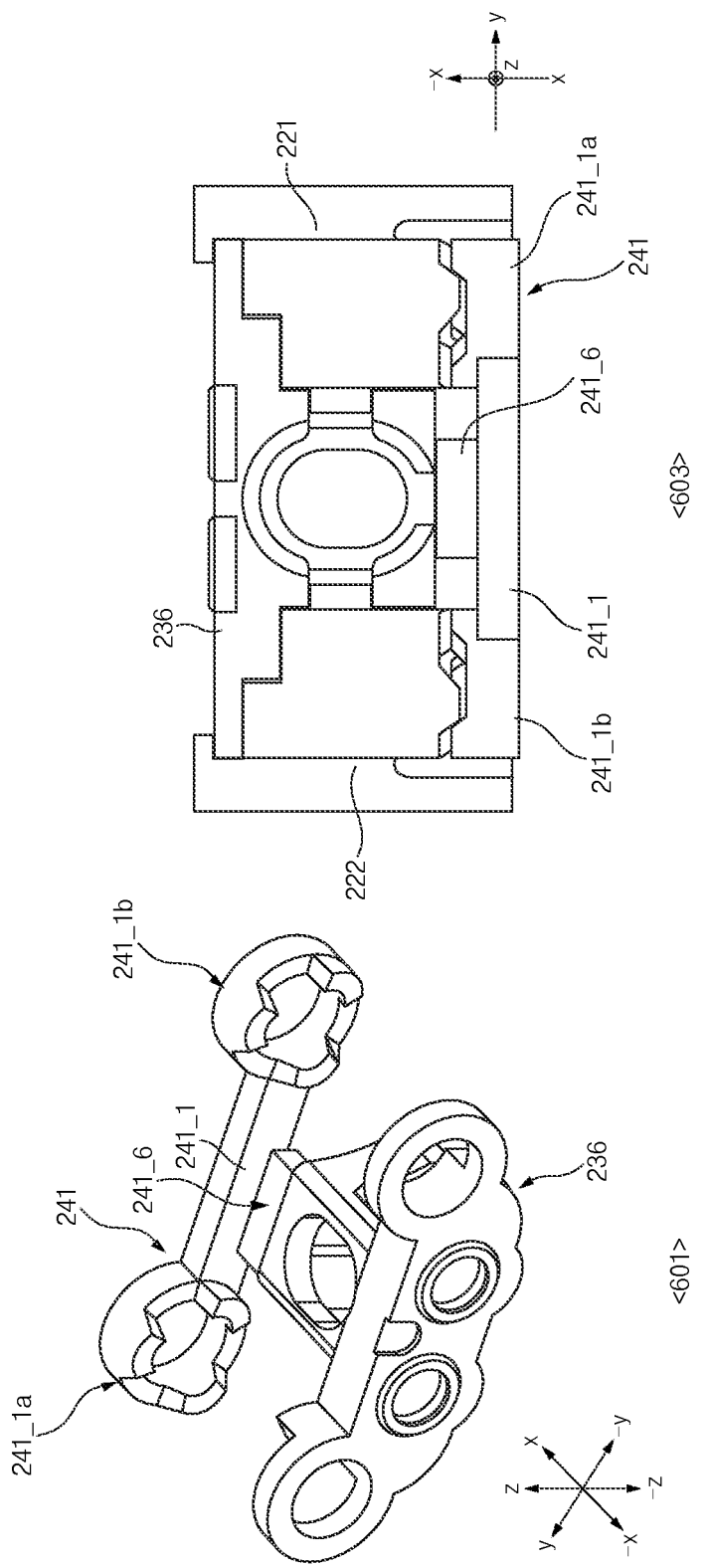
FIG. 6 is a view illustrating an example of another form of an additional structure according to an embodiment.

FIG. 6 is a view illustrating an example of another form of an additional structure according to an embodiment.

Referring to FIG. 6, referring to state 601 and state 603, the foldable electronic device 100 may include at least the stopper 236, the first arm part 221, the second arm part 222, and the fixed cam part 241, in which a fourth additional structure 241_6 is formed. The stopper 236 may have the same structure and size as those of the stopper 236 described above in FIG. 2, except for the part in which the additional structure is disposed. The first arm part 221 and the second arm part 222 may have the same structure and shape as those of the first arm part and the second arm part described above in FIG. 2. The fixed cam part 241 may have the same structure as that of the fixed cam part 241 described above in FIG. 2, except for the fourth additional structure 241_6. For example, the fixed cam part 241 may include the first fixed cam 241_1a, the second fixed cam 241_1b, and the cam body 241_1. The cam body 241_1 may be disposed between the first fixed cam 241_1a and the second fixed cam 241_1b.

The fourth additional structure 241_6 may be disposed on one side of the cam body 241_1. For example, the fourth additional structure 241_6 may be disposed on a surface of the cam body 241_1, which faces the −x axis. The fourth additional structure 241_6 may be disposed between the cam body 241_1 and the stopper 236. The fourth additional structure 241_6 may have a thickness corresponding to a thickness of the additional structure described above in FIGS. 2 to 5. The fourth additional structure 241_6 may be integrally formed with the cam body 241_1. Furthermore, after the fourth additional structure 241_6 is formed of a separate structure, it may be coupled to one side of the cam body 241_1 by using a coupling member or a bonding member. At least a portion of the fourth additional structure 241_6 may be made of the same material as that of the cam body 241_1. Furthermore, at least a portion of the fourth additional structure 241_6 may be formed through plastic injection-molding.

Figure 7:
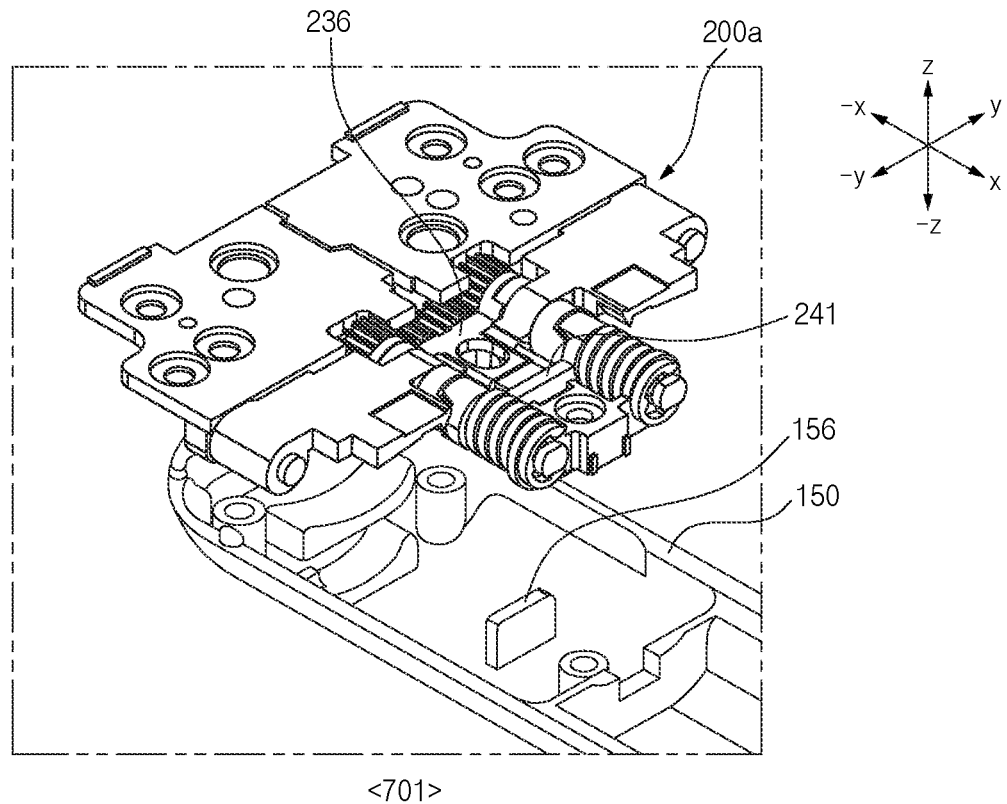
FIG. 7 is a view illustrating an example of another form of an additional structure according to an embodiment.
Figure 7:
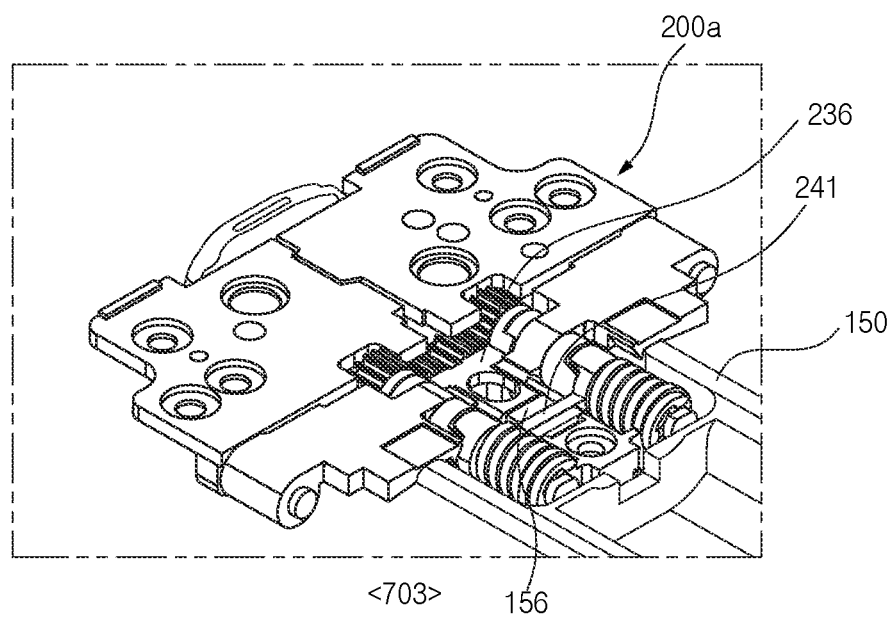

FIG. 7 is a view illustrating an example of another form of an additional structure according to an embodiment.

Referring to FIGS. 1A to 7, the foldable electronic device 100 according to the embodiment may include at least the first hinge structure 200a and the hinge housing 150. Additionally, the foldable electronic device 100 may further include at least a second hinge structure having the same structure as that of the first hinge structure 200a. The first hinge structure 200a may have the same structure as that of the hinge structure described above in FIG. 2, except for the structure in which the additional structure is disposed.

As in state 701 and state 703, a fifth additional structure 156 may protrude from a bottom surface of an inside of the hinge housing 150 in the z axis direction by a specific height. The fifth additional structure 156 may be integrally formed with the hinge housing 150 to be fixed to the bottom surface of the inside of the hinge housing 150. The width of the fifth additional structure 156 in the x axis direction may be larger than the width thereof in the y axis direction. According to an embodiment, the fifth additional structure 156 may have a structure that is similar to at least a portion of the additional structure described above in FIG. 2. The fifth additional structure 156 may be disposed between the stopper 236 and the fixed cam part 241 (e.g., the cam body) when the first hinge structure 200a is seated in the hinge housing 150. According to an embodiment, a bonding member may be further disposed between the fifth additional structure 156 and the stopper body 236_1.

According to an embodiment, the fifth additional structure 156 may include at least one boss that protrudes in the −x axis direction. The at least one boss formed in the fifth additional structure 156 may be coupled to at least one recess (e.g., the recess or the hole formed in the stopper body 236_1) formed in the stopper 236. Furthermore, the fifth additional structure 156 may include at least one recess or hole, and at least one boss may be disposed in the stopper body 236_1. Accordingly, the at least one boss formed in the stopper body 236_1 may be coupled to the recess (or hole) formed in the fifth additional structure 156, and may prevent movement of the fifth additional structure 156.

Meanwhile, although an area of the hinge housing 150 in which the fifth additional structure 156 is disposed, is illustrated in the illustrated drawings, the disclosure is not limited thereto. For example, the same structure as the fifth additional structure 156 may be disposed also in an area of the hinge housing 150, in which the second hinge structure is seated, and thus may be disposed between the stopper of the second hinge structure and the fixed cam part in correspondence to the seating of the second hinge structure.

According to an embodiment, the foldable electronic device 100 may employ at least one of the above-described structures described in FIGS. 5 to 7. For example, as described in FIG. 5, the foldable electronic device 100 may include at least one of the additional structures 261, 262, and 263 disposed in the stopper 236, the fourth additional structure 241_6 disposed in the fixed cam part 241, and the fifth additional structure 156 disposed in the hinge housing 150.

Figure 8:
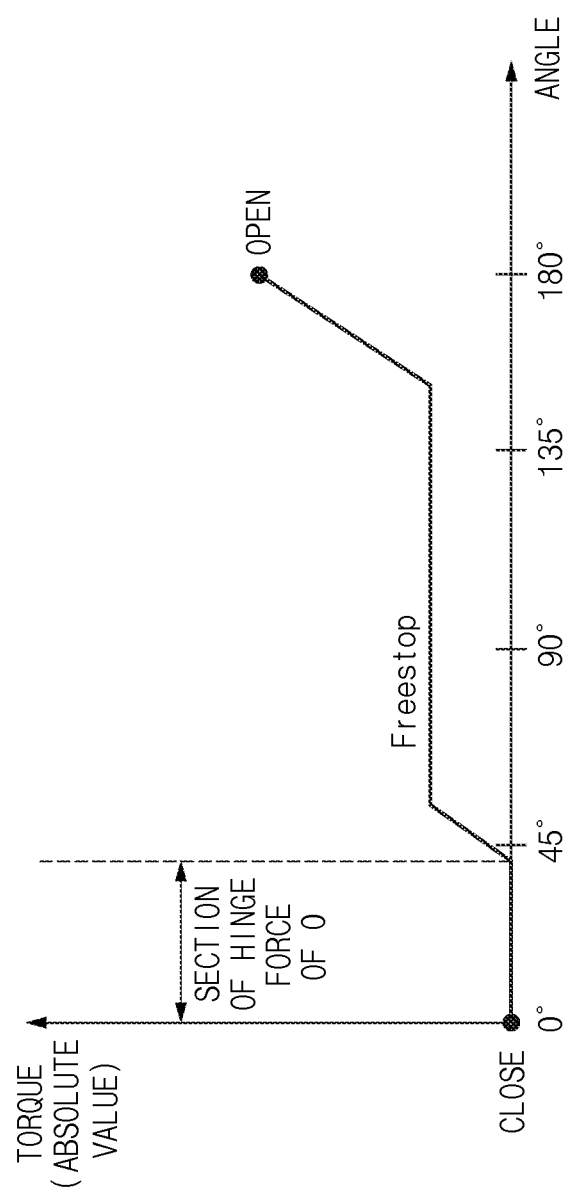
FIG. 8 is a view illustrating a change in torque according to an operation of a cam of a foldable electronic device according to an embodiment.

FIG. 8 is a view illustrating a change in torque according to an operation of a cam of a foldable electronic device according to an embodiment.

Referring to FIGS. 1A to 8, the foldable electronic device 100 according to the embodiment may provide a section, in which a hinge force is 0, as torque values of the elastic bodies 242a and 242b are 0 while the foldable electronic device 100 is unfolded to a specific angle (e.g., an angle between the first arm part 221 and the second arm part 222 is about 45 degrees) from the closed state. The closed state of the foldable electronic device 100 may be maintained by the magnet member 128 described above in FIG. 1A.

When an angle between the first arm part 221 and the second arm part 222 increases to about 45 degrees or more, the torque gradually increases, and between about 60 degrees to 150 degrees, the foldable electronic device 100 may be in a holding state (e.g., a free-stop, a state in which the current state is maintained when an additional pressure is not applied).

When an additional pressure is applied in a direction, in which the foldable electronic device 100 is unfolded in the holding state of 150 degrees, the torque may increase between 150 degrees and 180 degrees. At 180 degrees, the first arm part 221 and the second arm part 222 may be supported by the first stopper boss 236a_3 and the second stopper boss 236b_3 to be fixed such that an additional rotation is not made.

Figure 9A:
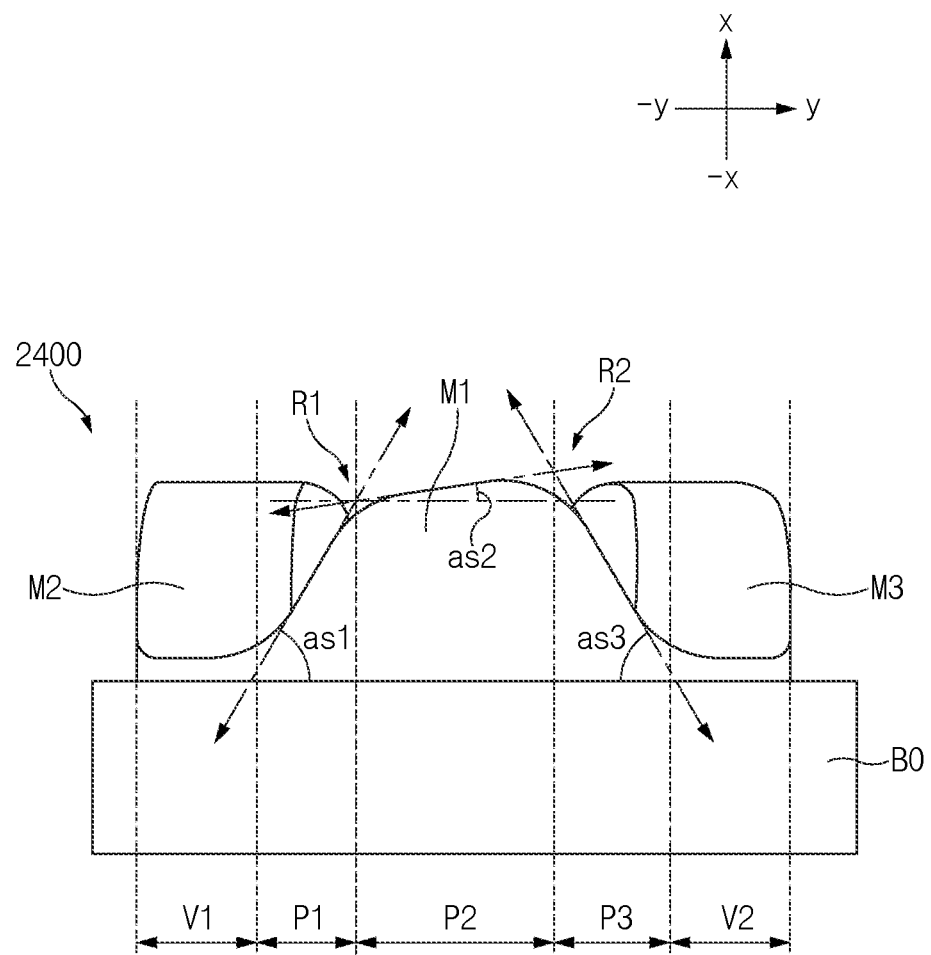
FIG. 9A is a view illustrating another example of a shape of a cam according to an embodiment.
Figure 9B:
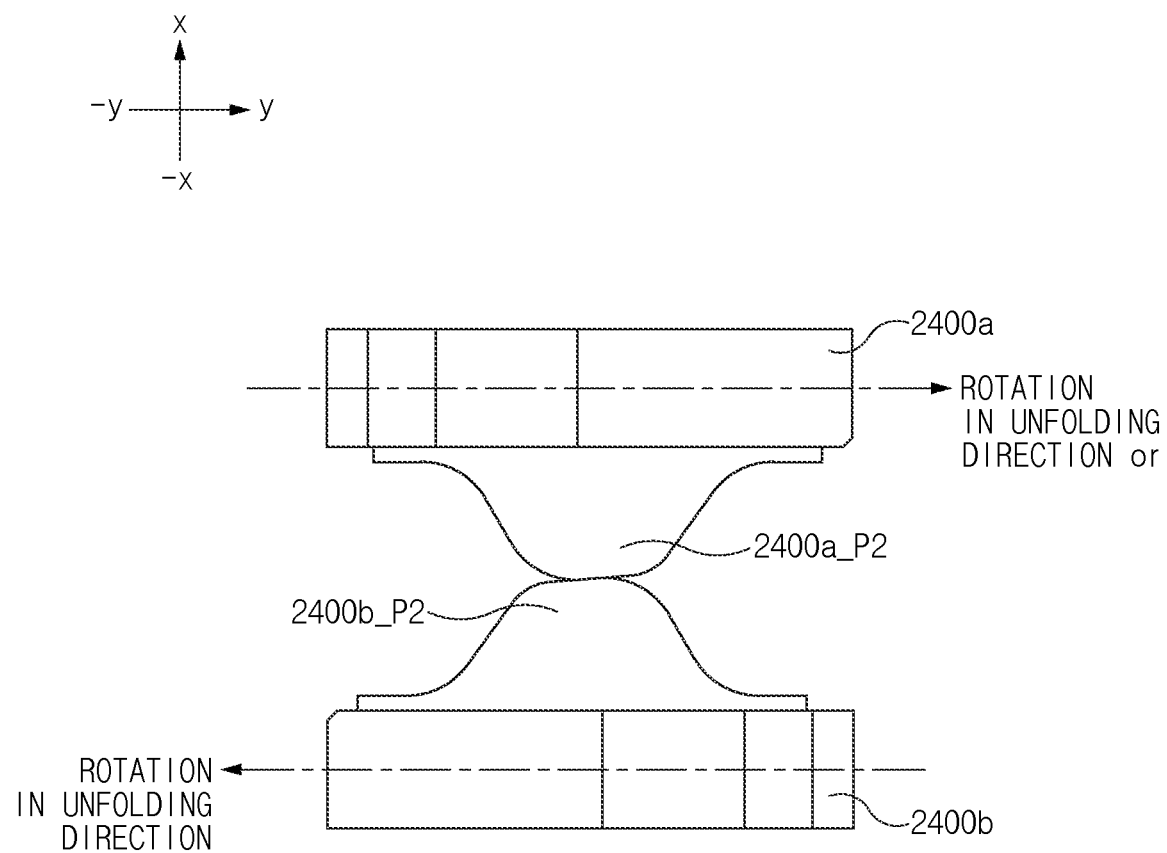
FIG. 9B is a view illustrating an example of a cam and a contact state of some mountains of a cam structure according to an embodiment.

FIG. 9A is a view illustrating another example of a shape of a cam according to an embodiment. FIG. 9B is a view illustrating an example of a cam (e.g., a rotary cam or a fixed cam) and a contact state of some mountains of a cam structure (e.g., a fixed cam or a rotary cam). A cam 2400a according to an embodiment may be applied to at least one of the cam or the cam structure described above in FIGS. 2 to 7.

Referring to FIG. 9A, the cam 2400*a* (or the cam structure) according to the embodiment may include a cam support portion BO, a plurality of mountains M1, M2, and M3, and a plurality of valleys V1 and V2. Although the illustrated drawings suggest the cam 2400*a* including three mountains M1, M2, and M3 and three valleys V1 and V2 (a valley covered by the first mountain M1 is not illustrated), the disclosure is not limited thereto. For example, the cam 2400*a* may have a structure including two or more cams and valleys. All of the plurality of mountains M1, M2, and M3 may have the same structure. Furthermore, a mountain of at least one of the plurality of mountains M1, M2, and M3 may have formed that are different from those of the other mountains. For example, as illustrated, at least one mountain may have a structure, in which a second part P2 corresponding to the center of the mountain has a specific inclination angle (an inclination angle that is larger than 0, for example, around about 5 degrees), and at least one of the remaining mountains may have a structure, in which a central portion of the mountain is flat.

According to an embodiment, at least one mountain of the plurality of mountains M1, M2, and M3, for example, the first mountain M1, as illustrated, may include a first part P1 having a first inclination angle as1, the second part P2 having a second inclination angle as2, and a third part P3 having a third inclination angle as3. One side (e.g., a −y axis end) of the first part P1 is connected to one side (e.g., a y axis end) of the first valley V1, and an opposite side (e.g., a y axis end) of the first part P1 may be connected to one side (e.g., a −y axis end) of the second part P2. The first part P1, for example, may have a ridge line having the first inclination angle as1 with respect to the y axis. The first inclination angle as1 may include an acute angle that is smaller than 90 degrees from the −y axis to the y axis direction.

One side (e.g., a −y axis end) of the second part P2 is connected to an opposite side (e.g., a y axis end) of the first part P1, and an opposite side (e.g., a y axis end) of the second part P2 may be connected to one side (e.g., a −y axis end) of the third part P3. The second part P2 may be disposed to protrude further than the first part P1 and the third part P3 in the x axis direction. A border area of the first part P1 and the second part P2 may be rounded at a specific first curvature R1. The second part P2 may have the second inclination angle as2 with respect to the y axis. The second inclination angle as2 may include an acute angle that is smaller than 90 degrees from the −y axis in the y axis direction, and an absolute value of the second inclination angle as2 may be smaller than an absolute value of the first inclination angle as1.

One side (e.g., a −y axis end) of the third part P3 may be connected to an opposite side (e.g., a y axis end) of the second part P2, and an opposite side (e.g., a y axis end) of the third part P3 may be connected to one side (e.g., a −y axis end) of the second valley V2. The third part P3 may be formed to have a specific inclination that is inclined from the second part P2 in the y axis direction. A border area of the second part P2 and the third part P3 may be rounded at a specific second curvature R2. The second curvature R2 may have a value that is smaller than the first curvature R1 (e.g., the first curvature R1 is smoother than the second curvature R2). The third part P3 may have a third inclination angle as3 with respect to the −y axis. The third inclination angle as3 may include an acute angle that is smaller than 90 degrees from the −y axis in the y axis direction, and an absolute value of the third inclination angle as3 may be smaller than an absolute value of the second inclination angle as2. According to certain embodiments, an absolute value of the third inclination angle as3 may be the same as or larger than the absolute value of the first inclination angle as1.

Referring to FIG. 9B, the cam shape described in FIG. 9A may be applied to the at least one cam or the at least one cam structure described above in FIGS. 2 to 7. For example, in the illustrated drawings, a protrusion of the cam 2400*a* may be disposed to protrude in the −x axis direction, and a protrusion of a cam structure 2400*b* may be disposed to protrude in the x axis direction. Furthermore, a convex-concave part of the cam 2400*a* and a convex-concave part of the cam structure 2400*b* may be disposed to face each other. At least a portion of a second part 2400*a*_P2 of the cam 2400*a* and at least a portion of a second part 2400*b*_P2 of the cam structure 2400*b*, as illustrated, may contact each other in a free-stop section (a section, in which the electronic device is held at a specific angle range due to the friction of the cam 2400*a* and the cam structure 2400*b*) of the electronic device (e.g., the foldable electronic device 100 of FIG. 2). According to an embodiment, when the electronic device is in a free-stop state, a repulsive force for restoring the display (the display 160 of FIG. 1) to the unfolding state (the state of FIG. 4D) may be shown.

According to an embodiment, the cam 2400*a* may be pushed in the y axis direction by a restoring force of the display (e.g., a repulsive force of the display is applied in the counter clockwise direction), and the cam structure 2400*b* may be pushed in the −y axis direction by a restoring force of the display (e.g., a repulsive force of the display is applied in the clockwise direction). In this process, because the second part 2400*a*_P2 of the cam 2400*a* and the second part 2400*b*_P2 of the cam structure 2400*b* contact each other while having the above-described second inclination angle as2, the cam 2400*a* and the cam structure 2400*b* of the disclosure may restrain pushing in the free-stop state (e.g., maintaining an angle between the first housing (e.g., the first housing 110 of FIG. 1A) and the second housing (e.g., the second housing 120 of FIG. 1A), which may occur regardless of an intention of the user by offsetting at least a portion of the repulsive force (or the restoring force) generated in the unfolding direction of the display. According to an embodiment, as described above in FIGS. 4A to 4D, the electronic device may be in a holding state (or a free-stop state) of a specific angle. In this case, the electronic device, as illustrated, may be disposed such that the cam 2400*a* and the cam structure 2400*b* are engaged with each other, and may offset a force, by which the repulsive force or the restoring force is applied in the unfolded state. Although FIG. 9B exemplifies a structure, in which apex portions of the mountains of both of the cam 2400*a* and the cam structure 2400*b* have the second inclination angle as2, the disclosure is not limited thereto. For example, the second part P2 having the second inclination angle as2 may be formed in any one of the cam 2400*a* or the cam structure 2400*b*.

Meanwhile, although FIG. 9B is illustrated with respect to a direction, in which the cam 2400*a* is rotated from the −y axis (or the left side) in the y axis (or rightward) direction, the disclosure is not limited thereto. For example, according to a design layout of the electronic device, a direction, in which the cam 2400*a* is rotated from the y axis in the −y axis direction, may be a direction, in which the display is operated in the unfolded state, from the closed state. Furthermore, in the illustrated description, the structure, in which the cam 2400*a* is rotated in the y axis direction and the cam 2400*b* is rotated in the −y axis direction, has been described, but as described above, the cam disposed in the cam member may not be rotated but may be linearly moved. Accordingly, any one of the cam 2400*a* or the cam 2400*b* may be fixed, and the other may be rotated in the clockwise direction or the counterclockwise direction. In this case, an inclined surface, in which an inclination increases in a rotational direction that is opposite to a direction, in which the flexible display is to be unfolded, may be formed in the corresponding cams 2400*a* and 2400*b*.

According to the above-described embodiments, an electronic device (or a portable electronic device, a portable communication device, a foldable electronic device, or a foldable electronic device having a communication function) of an embodiment may include a flexible display 160, a first housing 110 and a second housing 120, a hinge housing 150, and a hinge structure 200*a*, at least a portion of which is seated in the hinge housing, the hinge structure may further include a first rotary member 211 coupled to the first housing, a second rotary member 212 coupled to the second housing, a first arm part 221 coupled to the first rotary member and including a first rotary cam, a second arm part 222 coupled to the second rotary member and including a second rotary cam, a fixed cam part 241 including a first fixed cam engaged with the first rotary cam, a second fixed cam engaged with the second rotary cam, and a cam body connecting the first fixed cam and the second fixed cam, a stopper 236 that restricts rotational angles of the first arm part and the second arm part, and an additional structure 260 having a specific thickness and disposed between the stopper and the fixed cam part.

According to an embodiment, the additional structure may adjust an interval or a contact state between the fixed cam part and the first rotary cam or between the fixed cam part and the second rotary cam, in a closed state of the foldable electronic device.

According to an embodiment, the foldable electronic device may further include a bonding member disposed between the stopper and the additional structure.

According to an embodiment, the stopper may include a stopper body protruding toward the fixed cam part, and at least one recess formed in the stopper body, and the additional structure may include a support body.

According to an embodiment, the additional structure may further include a coupling boss disposed from one side of the support body toward the at least one recess, and inserted into the at least one recess.

According to an embodiment, the stopper may include a stopper body protruding toward the fixed cam part, a recess formed in the stopper body, and the additional structure may include a first support body made of a first material of a first thickness and disposed between the stopper and the fixed cam part, and a second support body disposed in parallel to the first support body and made of a second material.

According to an embodiment, the additional structure may further include a coupling boss disposed from one side of the first support body toward the recess, and inserted into the recess.

According to an embodiment, the additional structure may be integrally formed with the fixed cam part, and may be configured to extend from one surface of the fixed cam part to protrude toward the stopper.

According to an embodiment, the foldable electronic device may further include a bonding member disposed between the additional structure and the fixed cam part.

According to an embodiment, the additional structure may be a structure protruding from an inner bottom surface of the hinge housing in a direction toward where the flexible display is disposed, and the additional structure may be disposed between the stopper and the fixed cam part while the first hinge structure or the second hinge structure is seated in the hinge housing.

According to an embodiment, the foldable electronic device may further include a bonding member disposed between the additional structure and the stopper.

According to an embodiment, the additional structure may include a boss, and one side of the stopper may include a recess, into which at least a portion of the boss is inserted.

According to an embodiment, the stopper may include a boss protruding toward the additional structure.

According to an embodiment, the additional structure may be made of a material that is the same as at least one of the stopper or the fixed cam part.

According to an embodiment, the additional structure may be made of plastic.

A hinge structure according to an embodiment of the disclosure may further include a first rotary member coupled to a first housing, a second rotary member coupled to a second housing, a first arm part coupled to the first rotary member and including a first rotary cam, a second arm part coupled to the second rotary member and including a second rotary cam, a first fixed cam engaged with the first rotary cam and a second fixed cam engaged with the second rotary cam, a fixed cam part including a cam body connecting the first fixed cam and the second fixed cam, a stopper that restricts rotational angles of the first arm part and the second arm part, and an additional structure disposed between the stopper and the fixed cam part.

According to an embodiment, the additional structure may adjust a gap or a contact state between the fixing cam part and the first rotary cam or between the fixed cam part and the second rotary cam in the closed state of the electronic device.

According to an embodiment, the hinge structure may further include a bonding member disposed between the stopper and the additional structure.

According to an embodiment, the stopper may include a stopper body protruding toward the fixed cam part, and at least one hole formed in the stopper body, and the additional structure may further include at least one support body of a specific thickness disposed between the stopper and the fixed cam part, and a coupling boss disposed from one side of the support body toward the recess, and inserted into the recess.

According to an embodiment, the additional structure may be integrally formed with the fixed cam part, and is configured to extend from one surface of the fixed cam part to protrude toward the stopper.

Each of the elements (e.g., a module or a program) according to various embodiments may include a single or a plurality of entities, and some of the corresponding sub-elements may be omitted or another sub-element may be further included in various embodiments.

While the present disclosure has been shown and described with reference to various embodiments thereof, it will be understood by those skilled in the art that various changes in form and details may be made therein without departing from the present disclosure as defined by the appended claims and their equivalents.

The invention claimed is:
1. A foldable electronic device comprising:
a flexible display;
a first housing and a second housing;
a hinge housing; and a hinge structure, at least a portion of which is seated in the hinge housing,
wherein the hinge structure includes:
a first rotary member coupled to the first housing;
a second rotary member coupled to the second housing;
a first arm part coupled to the first rotary member and including a first rotary a second arm part coupled to the second rotary member and including a second rotary cam;
a fixed cam part including a first fixed cam engaged with the first rotary cam, a second fixed cam engaged with the second rotary cam, and a cam body connecting the first fixed cam and the second fixed cam;
a stopper configured to restrict rotational angles of the first arm part and the second arm part; and
an additional structure having a specific thickness and disposed between the stopper and the fixed cam part,
wherein the first rotary cam is configured to rotate about a first axis through a center of the first fixed cam and a center of the first rotary cam, and wherein the second rotary cam is configured to rotate about a second axis through a center of the second fixed cam and a center of the second rotary cam.

2. The foldable electronic device of claim 1, wherein the additional structure is configured to adjust an interval or a contact state between the fixed cam part and the first rotary cam or between the fixed cam part and the second rotary cam, in a closed state of the foldable electronic device.

3. The foldable electronic device of claim 2, further comprising:
a bonding member disposed between the stopper and the additional structure.

4. The foldable electronic device of claim 2, wherein the stopper further comprises:
a stopper body protruding toward the fixed cam part; and
at least one recess formed in the stopper body, and
wherein the additional structure includes a support body.

5. The foldable electronic device of claim 4, wherein the additional structure further comprises:
a coupling boss disposed from one side of the support body toward the at least one recess, and inserted into the at least one recess.

6. The foldable electronic device of claim 2, wherein the stopper further comprises:
a stopper body protruding toward the fixed cam part; and
a recess formed in the stopper body, and
wherein the additional structure includes:
a first support body made of a first material of a first thickness and disposed between the stopper and the fixed cam part; and
a second support body disposed in parallel to the first support body and made of a second material.

7. The foldable electronic device of claim 6, wherein the additional structure further comprises:
a coupling boss disposed from one side of the first support body toward the recess, and inserted into the recess.

8. The foldable electronic device of claim 1, wherein the additional structure is integrally formed with the fixed cam part, and is configured to extend from one surface of the fixed cam part to protrude toward the stopper.

9. The foldable electronic device of claim 1, further comprising:
a bonding member disposed between the additional structure and the fixed cam part.

10. The foldable electronic device of claim 1, wherein the additional structure is a structure protruding from an inner bottom surface of the hinge housing in a direction toward where the flexible display is disposed.

11. The foldable electronic device of claim 10, further comprising:
a bonding member disposed between the additional structure and the stopper.

12. The foldable electronic device of claim 10, wherein the additional structure further comprises:
a boss, and
wherein one side of the stopper includes a recess, into which at least a portion of the boss is inserted.

13. The foldable electronic device of claim 10, wherein the stopper further comprises:
a boss protruding toward the additional structure.

14. The foldable electronic device of claim 1, wherein the additional structure is made of a material that is the same as the stopper and/or the fixed cam part.

15. The foldable electronic device of claim 1, wherein the additional structure is made of plastic.

16. The foldable electronic device of claim 1, wherein the first rotary cam further comprises a plurality of mountains and a plurality of valleys, and
wherein at least one of the plurality of mountains includes:
a first part having a first inclination angle with respect to a horizontal axis;
a second part having a second inclination angle with respect to the horizontal axis; and
a third part having a third inclination angle with respect to the horizontal axis,
wherein an absolute value of the first inclination angle is smaller than 90 degrees, an absolute value of the second inclination angle is smaller than 5 degrees but larger than 0 degrees, and an absolution value of the third inclination angle is larger than the absolute value of the first inclination angle.

* * * * *